United States Patent
Ochiai et al.

(10) Patent No.: US 7,661,702 B2
(45) Date of Patent: Feb. 16, 2010

(54) VEHICULAR AIRBAG APPARATUS

(75) Inventors: Fumiharu Ochiai, Wako (JP);
Fumitoshi Yasuhara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 331 days.

(21) Appl. No.: 11/612,149

(22) Filed: Dec. 18, 2006

(65) Prior Publication Data
US 2007/0145726 A1      Jun. 28, 2007

(30) Foreign Application Priority Data
Dec. 28, 2005   (JP) .............................. 2005-377916

(51) Int. Cl.
*B60R 21/233* (2006.01)
(52) U.S. Cl. .................. 280/730.2; 280/743.1
(58) Field of Classification Search .................. 280/729, 280/730.2, 743.1
See application file for complete search history.

(56) References Cited

U.S. PATENT DOCUMENTS

| | | | | |
|---|---|---|---|---|
| 3,788,663 | A * | 1/1974 | Weman | 280/729 |
| 5,791,685 | A * | 8/1998 | Lachat et al. | 280/743.1 |
| 6,508,486 | B1 * | 1/2003 | Welch et al. | 280/730.2 |
| 6,575,496 | B2 * | 6/2003 | Hess et al. | 280/730.2 |
| 6,685,217 | B2 * | 2/2004 | Abe | 280/730.1 |
| 6,916,039 | B2 * | 7/2005 | Abe | 280/729 |
| 6,971,665 | B2 * | 12/2005 | Tanaka | 280/729 |
| 7,134,682 | B2 * | 11/2006 | Totsuka et al. | 280/728.2 |
| 7,195,276 | B2 * | 3/2007 | Higuchi | 280/730.1 |
| 7,407,182 | B2 * | 8/2008 | Aoki et al. | 280/730.2 |
| 7,448,644 | B2 * | 11/2008 | Zhong et al. | 280/729 |
| 7,469,923 | B2 * | 12/2008 | Ryan et al. | 280/730.2 |
| 2002/0175503 | A1 * | 11/2002 | Hess et al. | 280/730.2 |
| 2006/0175813 | A1 * | 8/2006 | Heudorfer et al. | 280/730.2 |
| 2007/0029765 | A1 * | 2/2007 | Ochiai et al. | 280/730.2 |

FOREIGN PATENT DOCUMENTS

JP          06-001188          1/1994

* cited by examiner

*Primary Examiner*—Paul N Dickson
*Assistant Examiner*—Nicole Verley
(74) *Attorney, Agent, or Firm*—Rankin, Hill & Clark LLP

(57) ABSTRACT

Airbag apparatus includes an airbag having at least two bag body sections superposed on each other. Gas flow-in portion for connection to an inflator is formed in one of the bag body sections adjacent to one edge of the one bag body section. Communicating hole is formed in the plurality of bag body sections adjacent to the other edge of the one bag body section. Upon activation of the inflator, gas is supplied into the one bag body section, through the gas flow-in portion, to develop the one bag body section. After that, the other bag body section superposed on the one bag body section is developed by the gas supplied through the communicating hole.

7 Claims, 20 Drawing Sheets

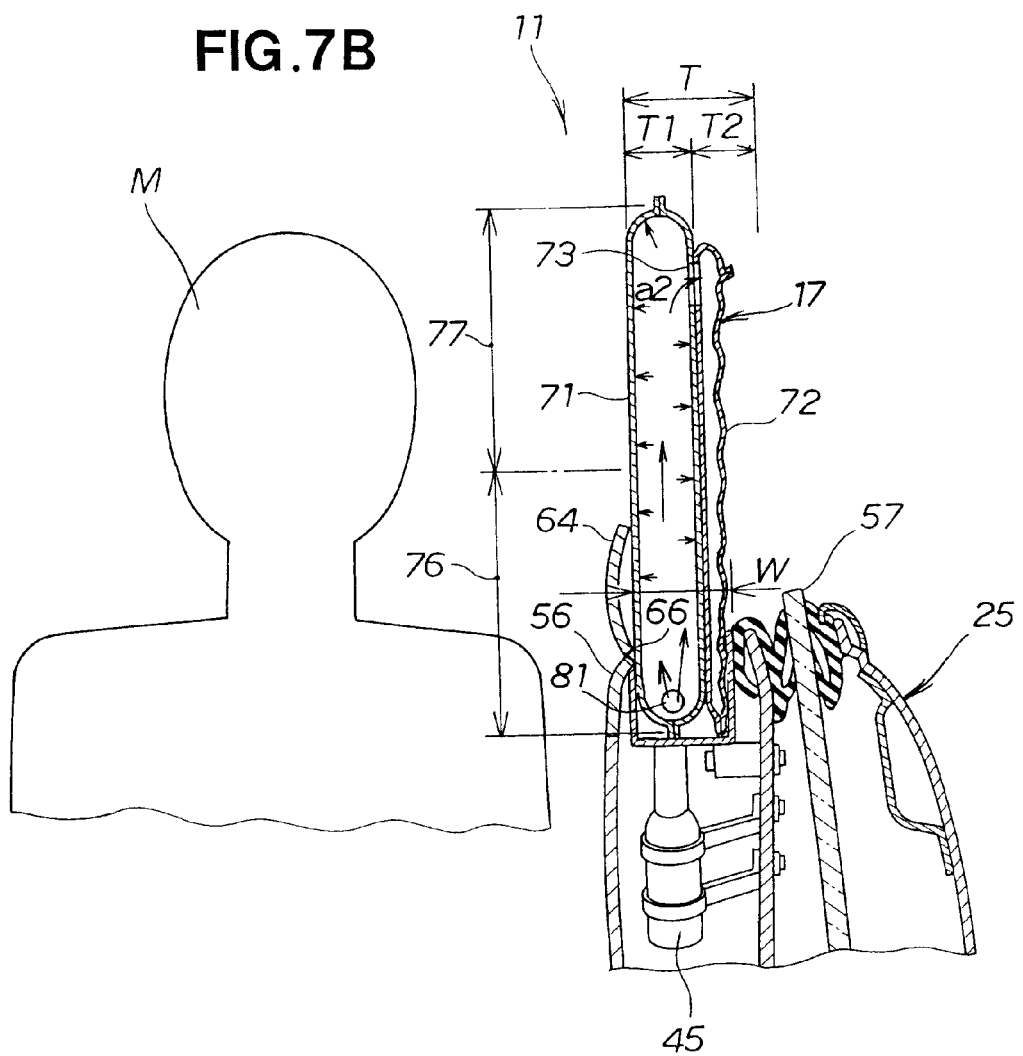

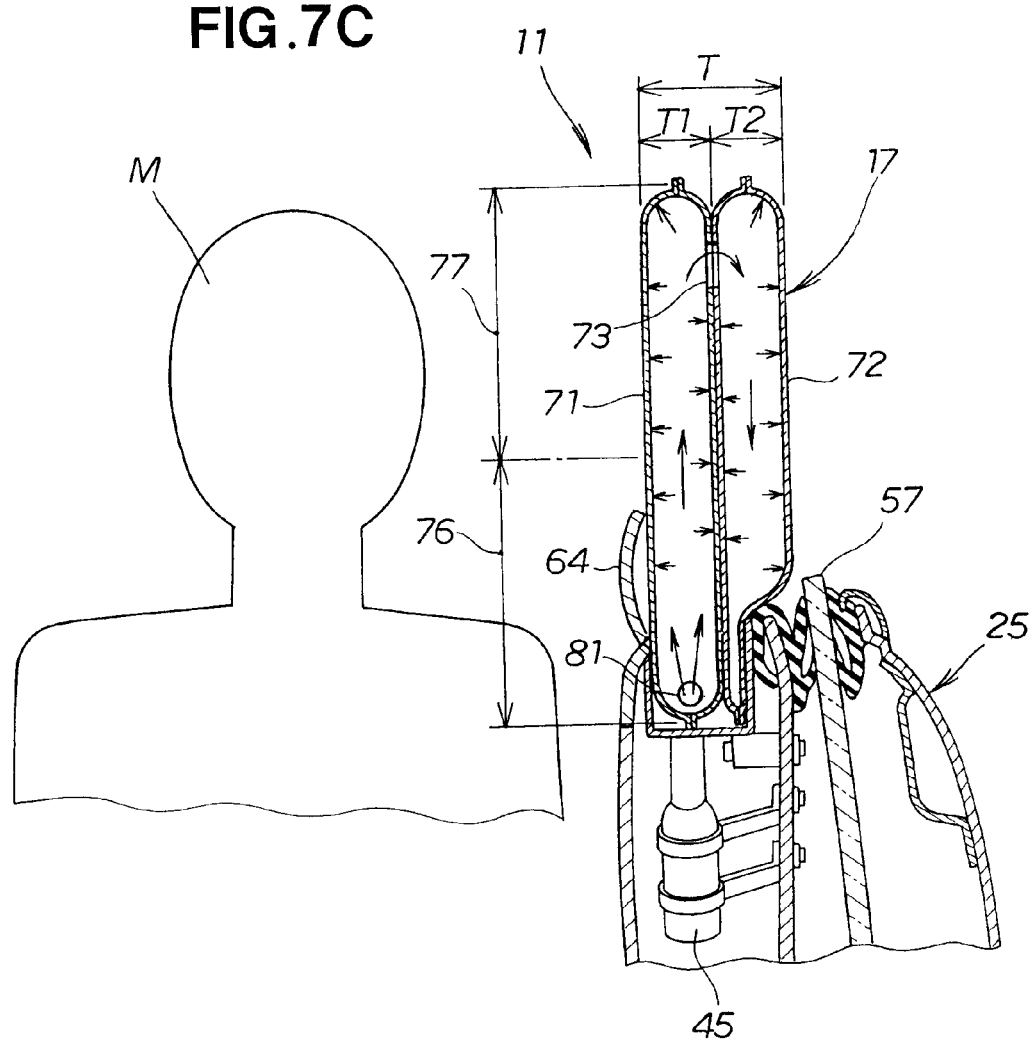

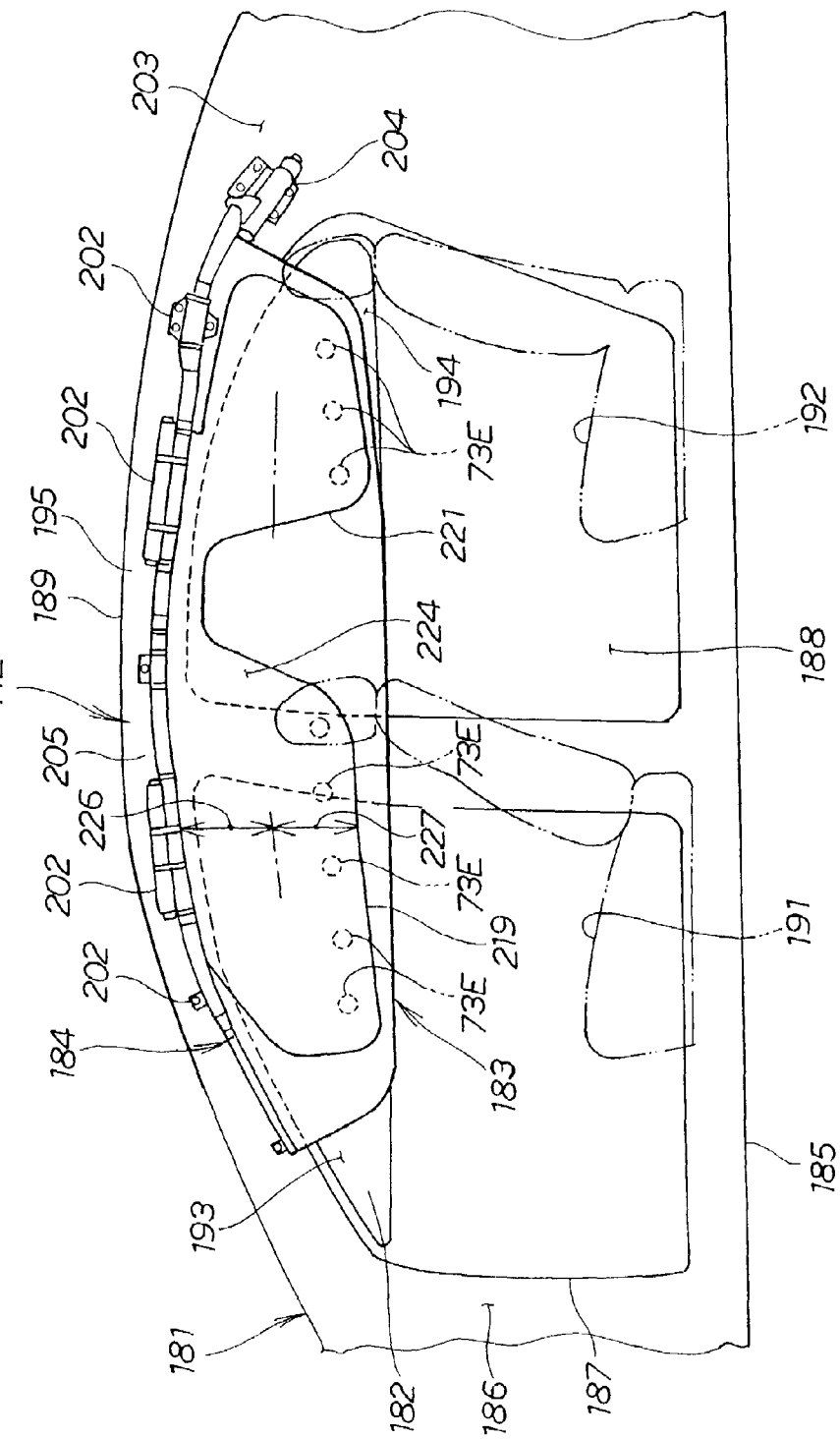

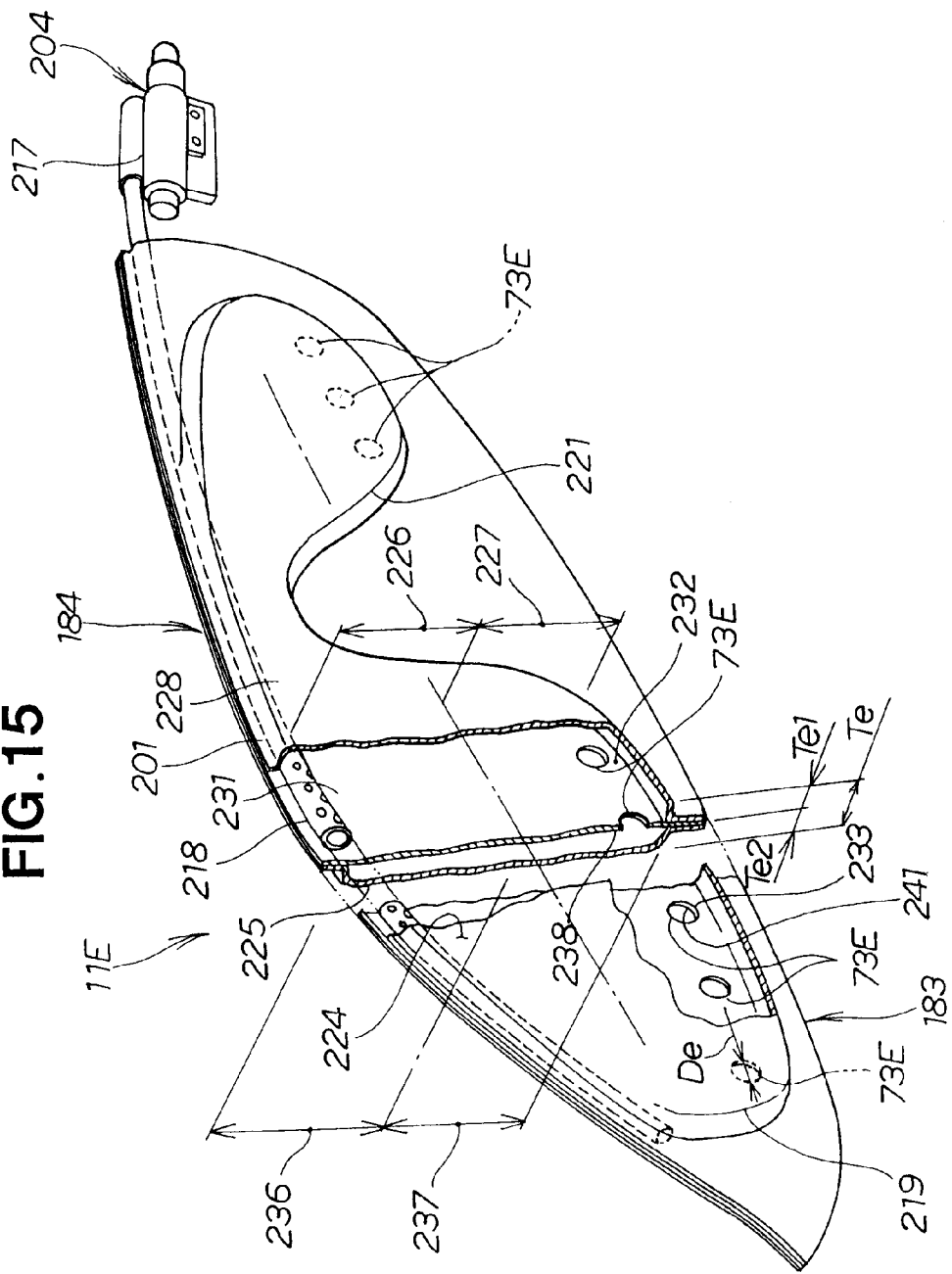

VEHICULAR AIRBAG APPARATUS

FIELD OF THE INVENTION

The present invention relates to a vehicular airbag apparatus for protecting a vehicle occupant from an impact applied to the vehicle.

BACKGROUND OF THE INVENTION

Generally, the airbag apparatus for a vehicle is constructed in such manner that, when the vehicle has been subjected to an external impact, it inflates the airbag, with gas emitted from an inflator, to thereby lessen or cushion the impact applied to a vehicle occupant. Japanese Laid-Open Patent Publication No. HEI-6-1188 discloses an airbag apparatus which has a plurality of inflating chambers formed via a strap with a view to achieving an enhanced strength of the inflated airbag.

The airbag apparatus disclosed in the HEI-6-1188 publication will be explained below with reference to FIG. 18.

The airbag apparatus of FIG. 18 includes a bag body 301 disposed inside a door adjacent to a driver's seat. The bag body 301 includes an upper cloth 302 and lower cloth 303 that are sewn together, with a strap 304 interposed therebetween, to secure an increased strength. More specifically, the upper cloth 302 and lower cloth 303 are sewn together to form a plurality of inflating chambers 306, 307, 308, 309 and 311, which are in fluid communication with one another through communicating holes 312, 313, 314 and 315 formed in the strap 304.

In the bag body 301, the individual chambers 306, 307, 308, 309 and 311 can be instantly filled with gas emitted from an inflator 316 through the communicating holes 312, 313, 314 and 315, but it is necessary to provide a great-size airbag opening portion through which the bag body 301 to be developed can jump out of the door into the interior of the vehicle, and provide a great-size lid for the airbag opening portion. However, design freedom would be considerably limited if the airbag opening portion and lid are formed into great sizes, particularly in the case of a curtain airbag apparatus provided on a vehicle roof or a side airbag apparatus provided on a vehicle door. Further, if the airbag opening portion and lid are formed into great sizes, it would be difficult to secure sufficient strengths of interior members, such as resin-made door linings.

SUMMARY OF THE INVENTION

In view of the foregoing prior art problems, it is an object of the present invention to provide an improved vehicular airbag apparatus which can reduce a load imposed on an interior member of the vehicle and achieve an enhanced design freedom by reducing the size of an airbag opening portion.

In order to accomplish the above-mentioned object, the present invention provides an improved airbag apparatus for a vehicle, which comprises: an inflator for emitting gas in response to an impact applied to the vehicle; and an airbag capable of being developed, by the gas emitted by the inflator, toward the interior of the vehicle. The airbag includes a plurality of bag body sections capable of being filled with the gas, the plurality of bag body sections being combined together in superposed relation to each other to provide a predetermined overall thickness. One of the plurality of bag body sections has a gas flow-in portion formed therein, adjacent to one edge of the one bag body section, in such a manner that the inflator is connectable with the gas flow-in portion. Communicating hole is formed in the plurality of bag body sections, adjacent to another edge of the one bag body section opposite from the one edge, to allow the plurality of bag body sections to communicate with each other through the communicating hole.

In the airbag apparatus of the present invention constructed in the aforementioned manner, only the one bag body section having the gas flow-in portion formed therein starts to be inflated ahead of the other bag body section, and a lid of a storage section storing the airbag is pushed open only by the inflating one bag body section. Such an arrangement can reliably prevent a pressure for inflating the other bag body section from being applied to an airbag opening portion, uncovered by the opened lid, at the same time the one bag body section opens the lid. Thus, not only a load imposed (or stress concentrated) on an interior member can be significantly reduced, but also the airbag opening can be reduced in size so that the design freedom of the airbag apparatus can be significantly enhanced.

In a preferred embodiment of the present invention, a pre-communicating hole, having a smaller size than the communicating hole, is formed in the plurality of bag body sections adjacent to the one edge. Thus, as the reactive gas is blown from the inflator, through the gas flow-in portion, into the one bag body section having the gas flow-in portion formed therein, the gas can be blown into all of the superposed bag body sections through the pre-communicating hole. Consequently, the preferred embodiment can inflate the superposed bag body sections in a shorter time than the counterparts where no such pre-communicating hole is provided, so that the necessary time for developing the superposed bag body sections can be reduced significantly.

In a preferred embodiment, a plurality of the communicating holes are formed adjacent to and along the other edge. Thus, it is possible to promptly develop the other bag body section communicating with the one bag body section via the plurality of communicating holes. Further, with the communicating holes arranged adjacent to and along the other edge, the other bag body section can be gradually developed from near the other edge and generally in parallel to the other edge, which permits stabilized development of the other bag body section.

It is preferable that a plurality of the pre-communicating holes be formed adjacent to and along the one edge.

Further, in a preferred embodiment, each of the plurality of bag body sections includes a plurality of independent or separate gas filling portions that are arranged in a front-rear direction of the vehicle and extend in an up-down direction of the vehicle. Because each of the plurality of bag body sections comprises the plurality of separate gas filling portions, the overall strength of the bag body section can be increased.

The plurality of gas filling portions are preferably inclined at a predetermined angle toward the rear of the vehicle, so that they can appropriately conform to an inclination angle of the backrest of a seat.

In a preferred embodiment, each of the plurality of bag body sections includes a front bag section to be developed in a position corresponding to a front seat of the vehicle, and a rear bag section, connecting with the front bag section, to be developed in a position corresponding to a rear seat of the vehicle. Thus, the airbag apparatus of the invention can be appropriately applied to four-seat sedans etc.

BRIEF DESCRIPTION OF THE DRAWINGS

Certain preferred embodiments of the present invention will hereinafter be described in detail, by way of example only, with reference to the accompanying drawings, in which:

FIGS. 7A-7C are sectional views showing a manner in which the right first airbag body is developed;

FIG. 14 is a side view showing part of a vehicle equipped with a fifth embodiment of the airbag apparatus of the present invention;

FIG. 15 is a perspective view of a right curtain airbag device shown in FIG. 14;

DETAILED DESCRIPTION OF THE PREFERRED EMBODIMENTS

Figure 1:
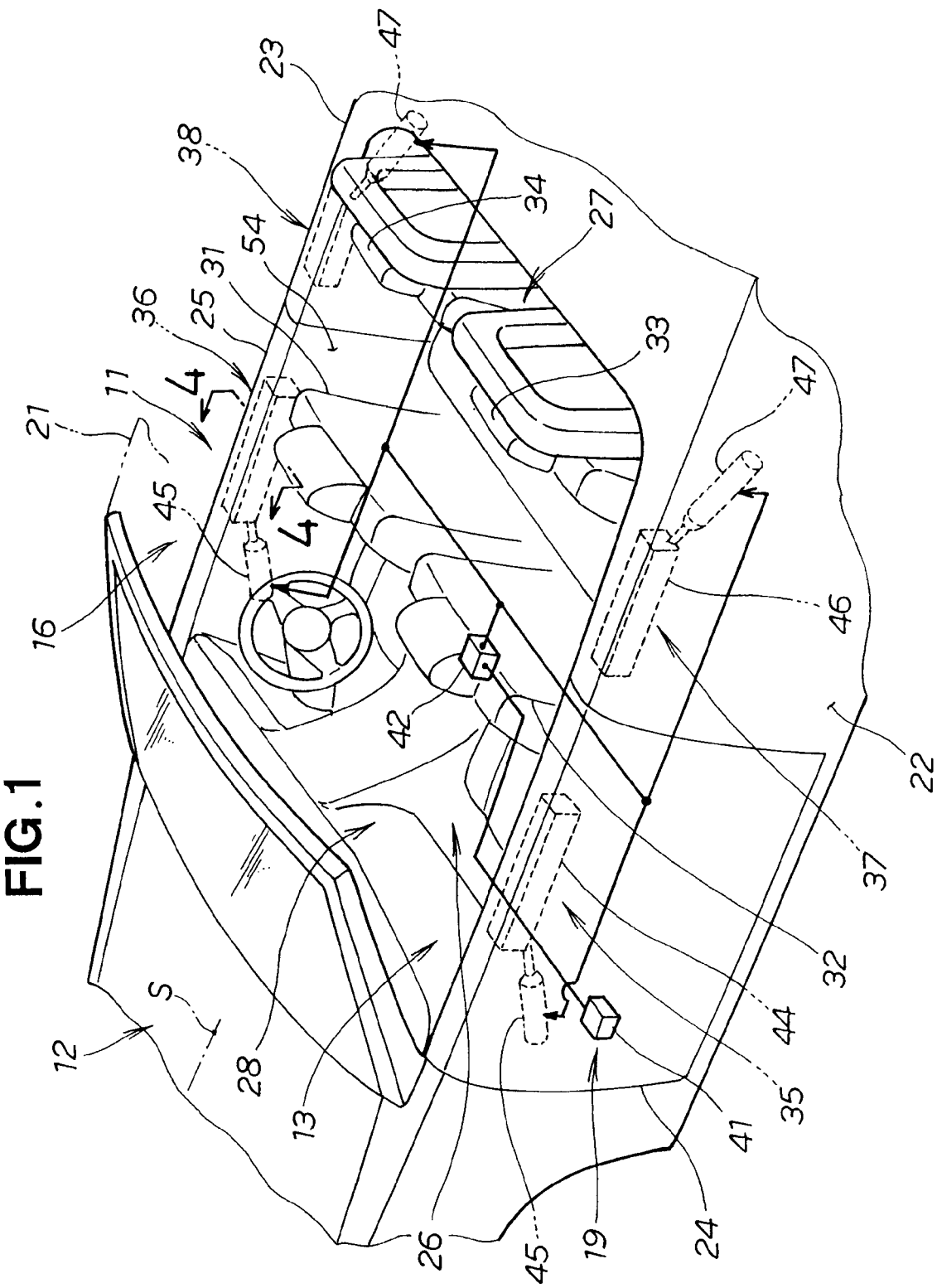
FIG. 1 is a perspective view showing part of a vehicle equipped with a first embodiment of an airbag apparatus of the present invention.
Figure 2:
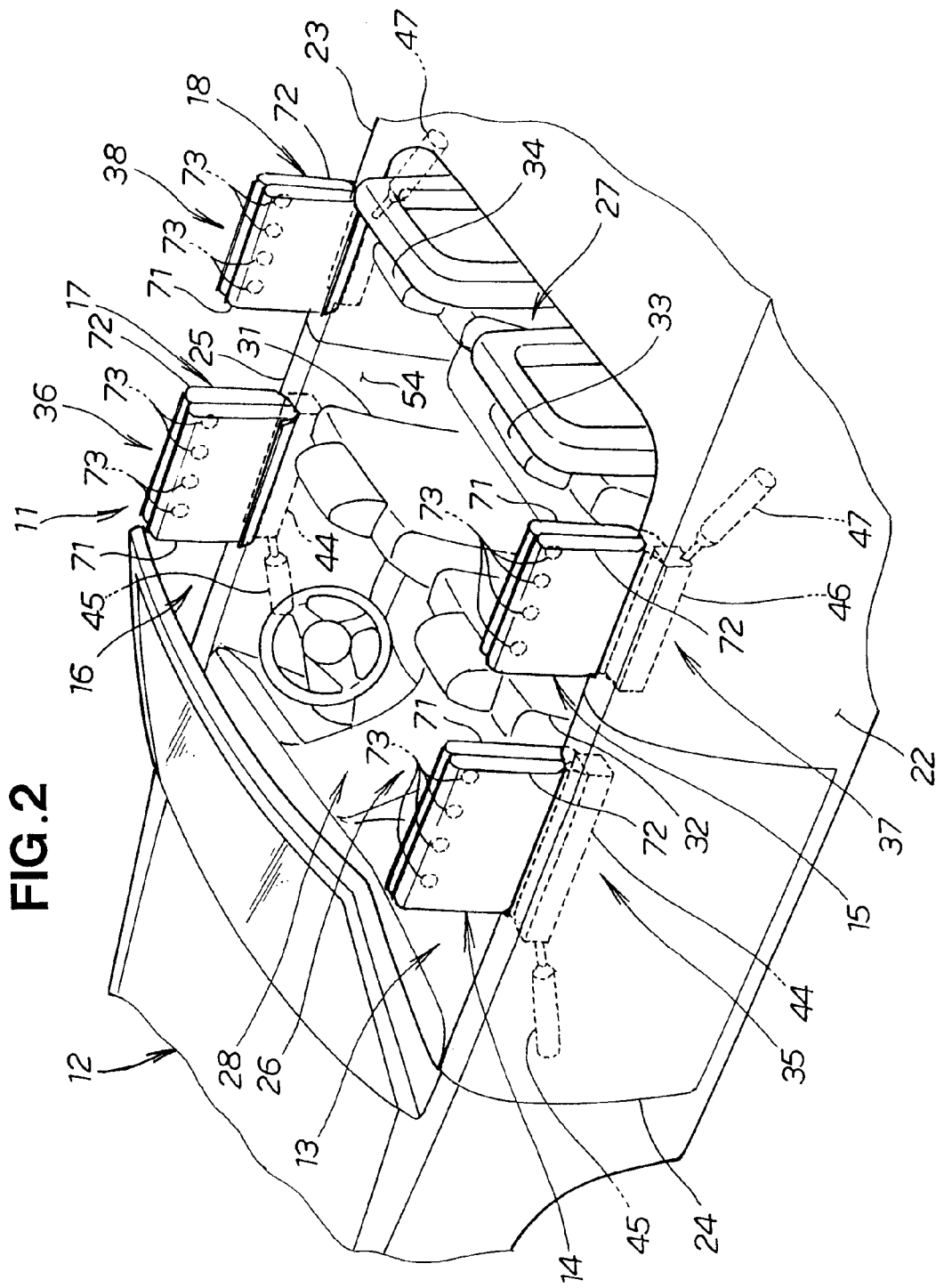
FIG. 2 is a perspective view showing part of the vehicle when the airbag apparatus of FIG. 1 has been activated.

FIGS. 1-7C show a first embodiment of an airbag apparatus of the present invention. As shown in FIGS. 1 and 2, the first embodiment of the airbag apparatus 11 is constructed to develop left front and left rear air bags 14 and 15 disposed along the inner surface of a left side wall 13 of a vehicle 12, and develop right front and right air bags 17 and 18 disposed along the inner surface of a right side wall 16 of the vehicle 12. Such development of the left and right airbags 14, 15 and 17, 18 is controlled by an airbag control unit 19.

The vehicle 12 is a four-seat convertible vehicle with an openable/closeable roof 21, which also includes left and right side bodies 22 and 23, left and right doors 24 and 25, front seats 26, and rear seats 27 located behind the front seats 26. Vehicle compartment 28 is formed by closing the roof 21.

The left side wall 13 comprises the left door 24, door glass, and left side body 22, glass and panel disposed in positions corresponding to the rear seats 27.

The right side wall 16 comprises the right door 25, door glass 57 (FIG. 3), and right side body 23, glass and panel disposed in positions corresponding to the rear seats 27.

The front seats 26 are a driver's seat 31 and a front passenger's seat 32. The rear seats 27 are a left rear seat 33 located immediately behind the front passenger's seat 32, and a right rear seat 34 located immediately behind the driver's seat 31.

In the illustrated example, the airbag apparatus 11 comprises a left front airbag device 35 disposed within the left door 24, a right front airbag device 36 disposed within the right door 25, a left rear airbag device 37 disposed within the left side body 22, and a right rear airbag device 38 disposed within the right side body 23.

The airbag control unit 19 includes a vehicle state detection section 41 for detecting a collision or overturn of the vehicle 12, and a control section 42 for controlling the airbag apparatus 11 on the basis of information output from the vehicle state detection section 41.

The left front airbag device 35 includes the left first airbag body (airbag) 14 stored in a case 44 disposed within the left door 24, and an inflator (gas generator device) 45 connected to the left first airbag body 14. The inflator 45 is connected to the above-mentioned control section 42.

The right front airbag device 36, which is provided horizontally symmetrically with the left front airbag device 35 about a symmetry axis S, includes the right first airbag body (airbag) 17 and an inflator 45.

The left rear airbag device 37 includes the left second airbag body (airbag) 15 stored in a case 46 disposed within the left side body 22, and an inflator (gas generator device) 47 connected to the left second airbag body 15. The inflator 47 is connected to the above-mentioned control section 42.

Further, the right rear airbag device 38, which is provided horizontally symmetrically with the left rear airbag device 37 about the symmetry axis S, includes the right second airbag body (airbag) 18 and an inflator 47.

Figure 3:
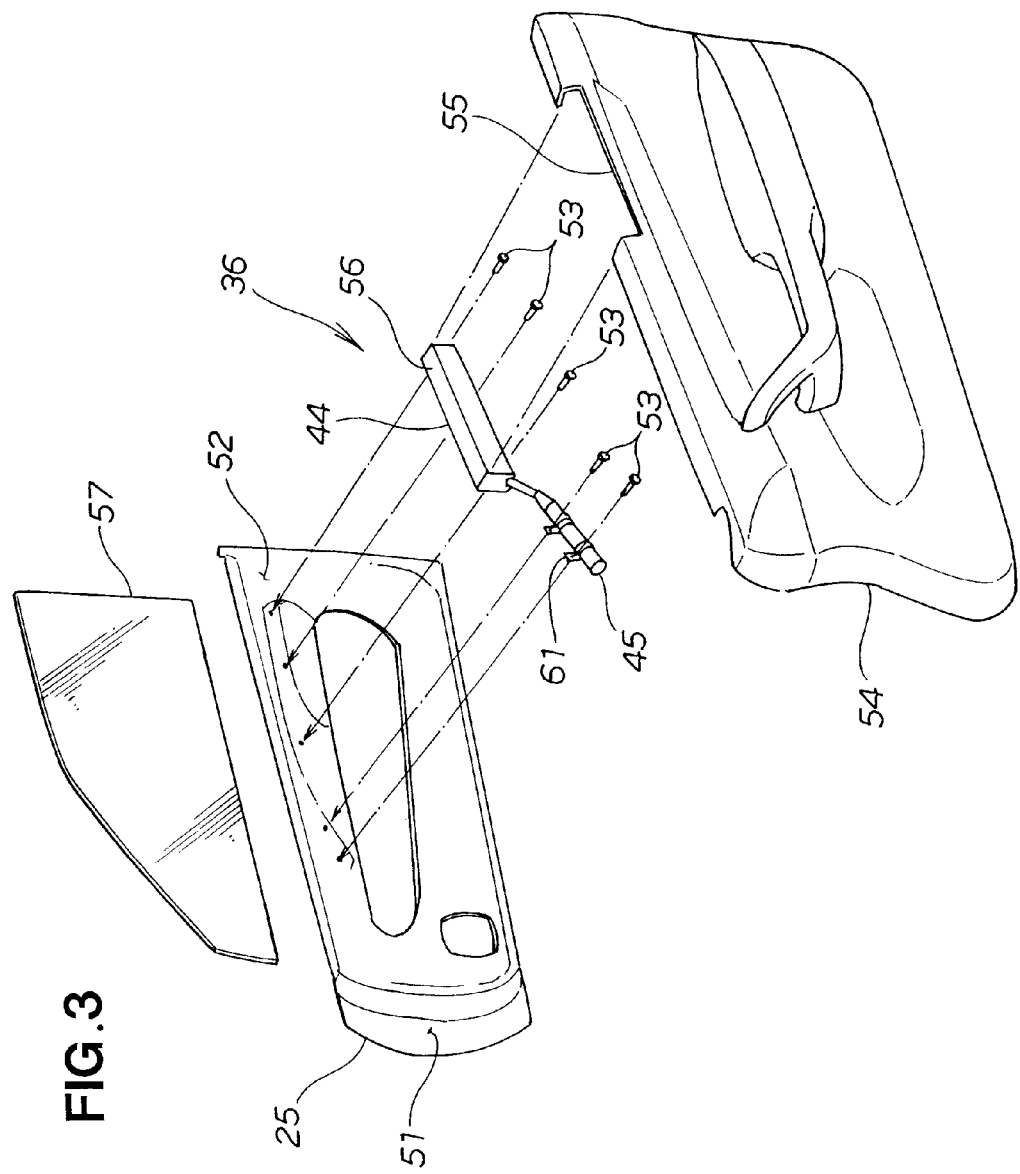
FIG. 3 is an exploded perspective showing relationship among a right front airbag device of FIG. 2, interior members and inner panel.

FIG. 3 is an exploded perspective view of the right front airbag device 36 of FIG. 1.

The storage case 44 is fixed, via a plurality of bolts 53, to an inner, i.e., compartment-side, surface 52 of an inner panel 51 of the right door 25, and the inflator 45 of the right front airbag device 36 is fixed, via a plurality of bolts 53, to the compartment-side surface 52 of the inner panel 51. Door interior member (door lining) 54 is fixed to the compartment-side surface 52 of the inner panel 51. Interior member 56 of the storage case 44 is fitted in a lid-fitting portion 55 formed in the door interior member (door lining) 54. The door glass 57 is provided outside the inner panel 51.

Figure 4:
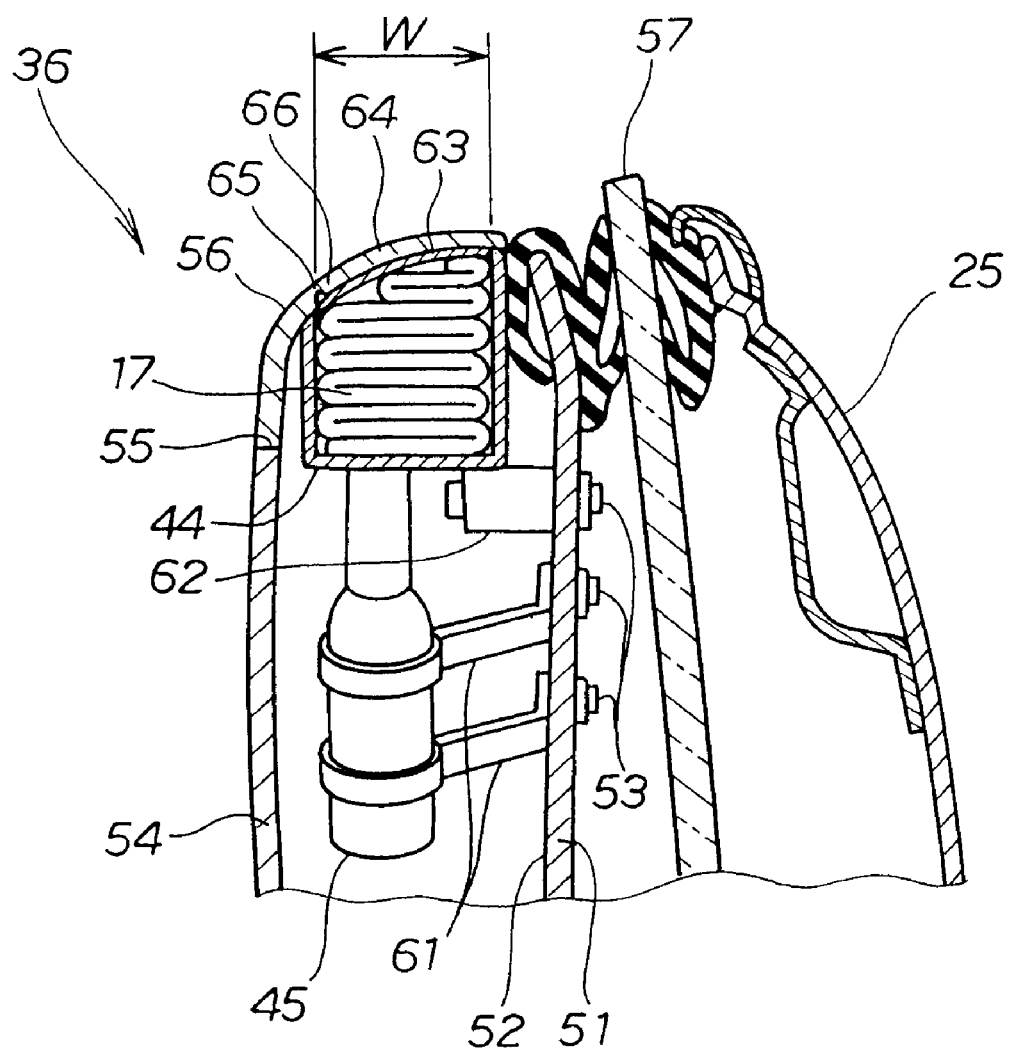
FIG. 4 is an enlarged sectional view taken along line 4-4 of FIG. 1.

As shown in greater detail in FIG. 4, the right front airbag device 36 is disposed between the inner panel 51, formed of steel, of the right door 25 and the interior member 54 formed of resin. The inflator 45 is fixed to the compartment-side surface 52 via brackets 61, and the storage case 44 is mounted to the compartment-side surface 52 via a bracket 62. The right first airbag body 17 is stored in the case 44 in folded form. The storage case 44 is closed with a reinforcing lid 63 that is in turn covered with the resin-formed case interior member 56. The interior member 56 forms a lid 64 that will be later described.

The case interior member 56 is fitted in the lid-fitting portion 55 formed in the door interior member 54 and has a pattern and color similar to those of the door interior member 54.

The lid 64 has a hinge section 65 in a portion of a width W formed in the case interior member 56; more specifically, the hinge section 65 is in the form of a groove formed in the reverse or inner side of the case interior member 56. As the lid 64 is pivoted open with the hinge section 65 functioning as a pivot axis, there is formed an airbag opening portion 66 of the width W.

The inflator 45, which is constructed in the conventionally-known manner, inflates the right first airbag body 17 of the right door 25 with reactive gas emitted therefrom.

Figure 5:
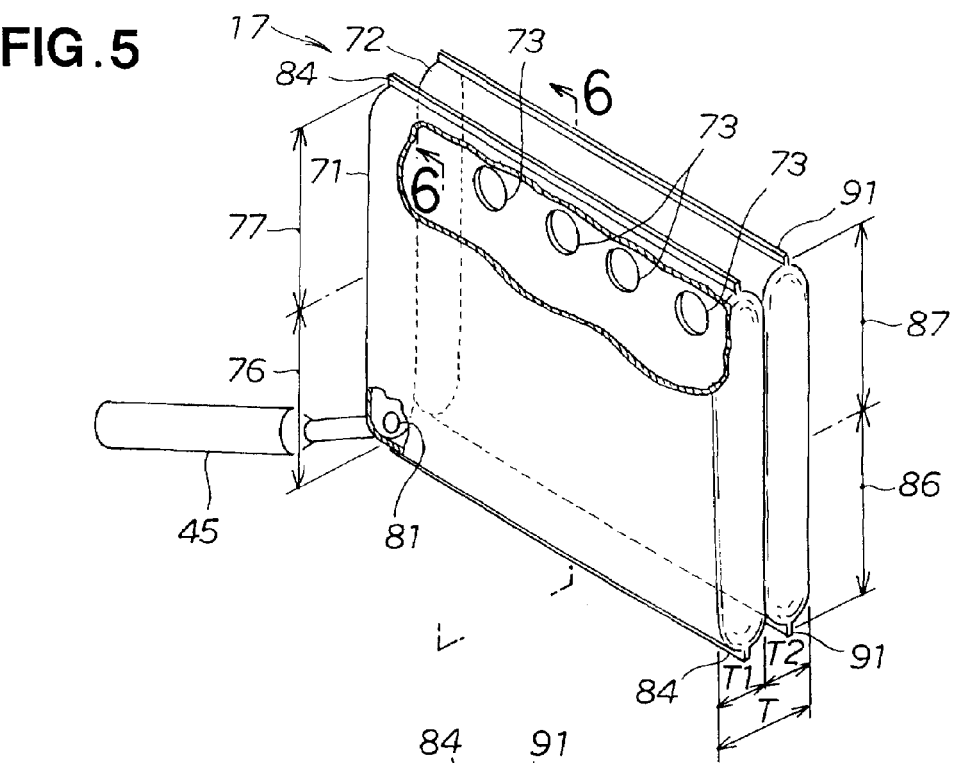
FIG. 5 is a partly-broken-away perspective view of a right first airbag body shown in FIG. 2.
Figure 6:
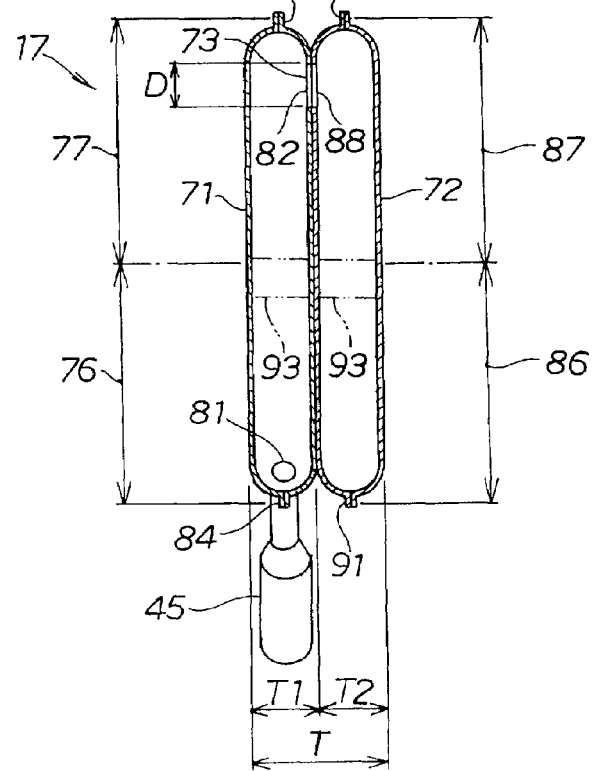
FIG. 6 is a sectional view taken along line 6-6 of FIG. 5.
Figure 7A:
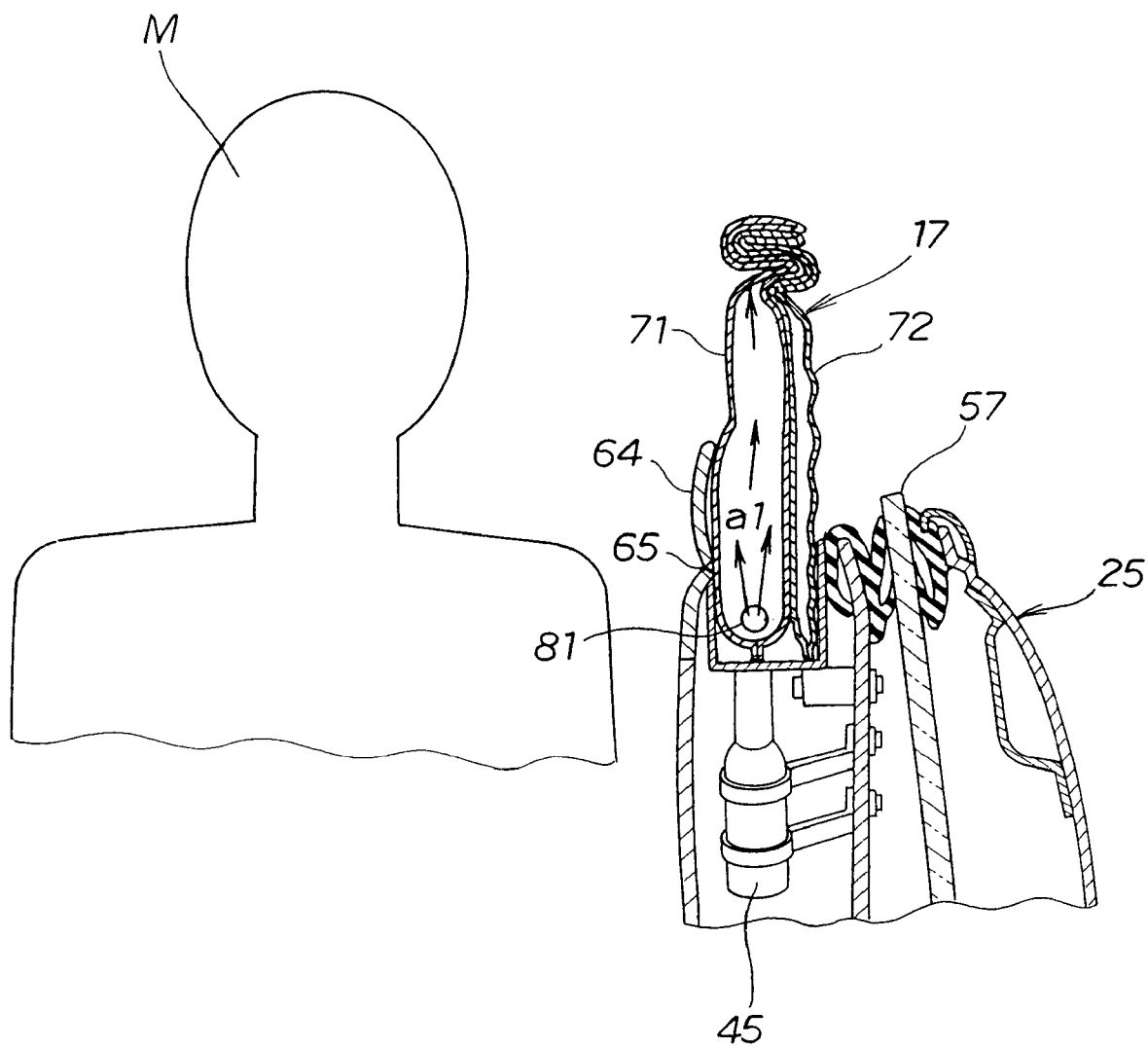

As shown in FIGS. 5 and 6, the right first airbag body 17 comprises a first bag body section 71, and a second bag body section 72 combined with the first bag body section 71 in superposed relation thereto. The first and second bag body sections 71 and 72 communicate with each other through one or more communicating holes 73. The first bag body section 71 is disposed in a position corresponding to a vehicle occupant M (see FIGS. 7A, 7B and 7C), and the second bag body section 72 is disposed in a position corresponding to the door glass 57 (FIGS. 7A, 7B and 7C).

The right first airbag body 17 is formed to be inflatable to a thickness T in its inflated state. The thickness T is set to about 1.7 times as great as the width W of the airbag opening portion 66 shown in FIG. 4.

The first bag body section 71 comprises a lower half portion 76 closer to one edge of the section 71, and an upper half portion 77 closer to another edge, opposite from the one edge, of the section 71. Gas flow-in portion 81 for connection to the inflator 45 is formed in a lower corner of the lower half portion 76. Holes 82, each forming a part of one of the communicating holes 73, are formed in an upper region of the upper half portion 77. The holes 82 and the communicating holes 73 each have a diameter D.

The first bag body section 71 has a thickness T1 that is about 50% of the above-mentioned thickness T of the entire right first airbag body 17 and about 60% of the width W of the airbag opening portion 66. Reference numeral 84 indicates a sewn portion of the first bag body section 71.

The second bag body section 72 comprises a lower half portion 86 closer to one edge of the section 72, and an upper half portion 87 closer to another edge, opposite from the one edge, of the section 72. The upper half portion 87 has, in its upper region, holes 88 each corresponding in position and size to one of the above-mentioned holes 82 of the first bag body section 71 and forming a part of one of the communicating holes 73.

The second bag body section 72 has a thickness T2 that is about 50% of the above-mentioned thickness T of the entire right first airbag body 17 and about 60% of the width W of the airbag opening portion 66. Reference numeral 91 indicates a sewn portion of the second bag body section 72.

Namely, each of the communicating holes 73 comprises a combination of one of the holes 82 of the first bag body section 71 and one of the holes 88 of the second bag body section 72 which is located in alignment with the hole 82.

As illustratively indicated by imaginary or two-dot-lines in FIG. 6, straps 93 may be provided within the right first airbag body 17.

The right second airbag body 18 shown in FIG. 2 is similar in construction to the above-described right first airbag body 17. The left first airbag body 14 is provided within the left door 24 and horizontally symmetrically with the right first airbag body 17 disposed within the right door 25. The left second airbag body 15 is provided horizontally symmetrically with the right second airbag body 18.

Figure 10:
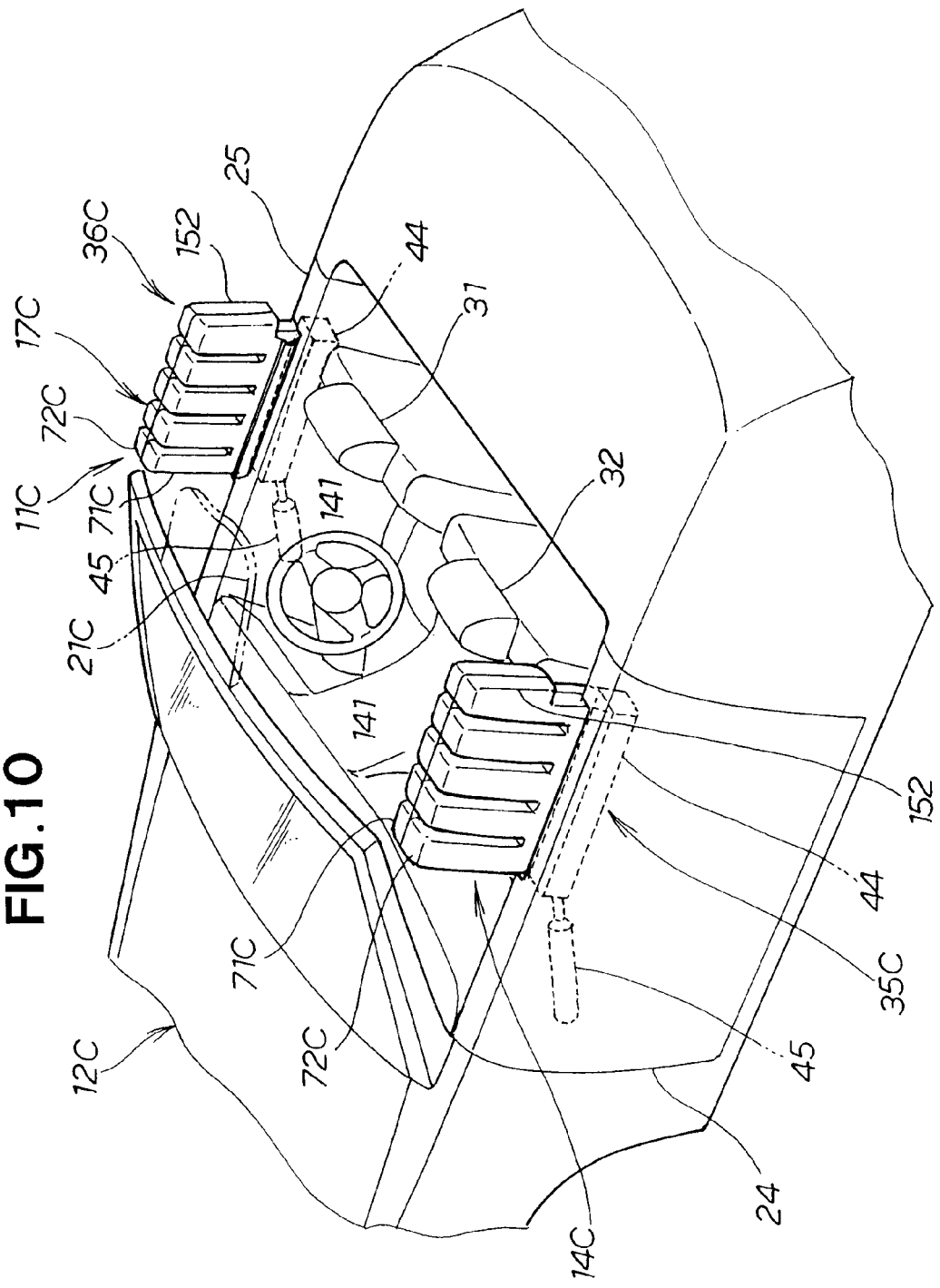
FIG. 10 is a perspective view showing part of a vehicle equipped with a third embodiment of the airbag apparatus of the present invention.

Whereas the first embodiment of the airbag apparatus 11 is shown and described here as applied to the four-seat convertible vehicle 12, the airbag apparatus of the present invention may be applied to a two-seat convertible vehicle 12C as shown in FIG. 10. In the case where the airbag apparatus of the present invention is applied to the two-seat convertible vehicle 12C, the left rear airbag device 37 provided within the left side body 22 and the right rear airbag device 38 provided within the right side body 23 may be dispensed with.

Now, a description will be given about behavior of the first embodiment of the airbag apparatus, with primary reference to FIGS. 7A, 7B and 7C and with additional reference to FIGS. 1-6. Although the behavior of the first embodiment of the present invention will be described below representatively in relation to the right first airbag body 17 provided in the right door 25, it should be appreciated that the left first airbag body 14 provided in the left door 24 and the left and right second airbag bodies 15 and 18 provided in the left and right side bodies 22 and 23 behave in a similar manner to the right first airbag body 17.

When the vehicle 12 has been subjected to a considerably great impact by colliding with some external object or has started overturning (falling sideway), the left and right first airbag bodies 14 and 17 provided in the left and right doors 24 and 25 and the left and right second airbag bodies 15 and 18 provided in the left and right side bodies 22 and 23 are caused to inflate simultaneously.

More specifically, when the vehicle 12 has caused a front or lateral collision, the above-mentioned control section 42 determines, on the basis of collision information output from the vehicle state detection section 41 shown in FIG. 1, that a collision has occurred, and then it outputs activation information. In response to the activation information output from the control section 42, the inflator 45 in the right door 25 is activated to blow the reactive gas only into the first bag body section 71, as indicated by arrows a1 in FIG. 7A, so that the first bag body section 71 pushes and opens the reinforcing lid 63 and lid 64.

As the inflator 45 continues to blow the reactive gas into the first bag body section 71, only the first bag body section 71 is first inflated to the thickness T1 to occupy about 40% of the width W of the airbag opening portion 66, as shown in FIG. 7B. Thus, it is possible to reduce a load transmitted to the case interior member 56 when the first bag body section 71 is developed.

As the inflator 45 further continues to blow the reactive gas into the first bag body section 71, the reactive gas, having almost filled the first bag body section 71, passes through the plurality of communicating holes 73, as indicated by arrows a2 in FIG. 7B, to start gradually inflating the second bag body section 72 from an upper region of the section 72 downward.

By the reactive gas blown in through the communicating holes 73, the second bag body section 72 is inflated to the thickness T2, so that the entire right first airbag body (airbag) 17 is developed to the predetermined thickness T.

Thus, in the airbag apparatus 11, the right first airbag body 17 in its developed state can have the predetermined thickness T by the superposed first and second bag body sections 71 and 72 being filled with the gas. Because the gas flow-in portion 81 for connection to the inflator 45 is formed in the lower half portion 76, closer to the one edge, of the first bag body section 71 and the communicating holes 73 for allowing the first and second back body sections 71 and 72 to communicate with each other are formed in the upper half portion 77 closer to the other edge opposite from the one edge, the first bag body section 71, having the gas flow-in portion 81 formed therein, starts to be inflated ahead of the second bag body section 72, and then the lid 64 can be pushed open only by the first bag body section 71. Thus, in this case, the pressure for inflating the second bag body section 72 is prevented from being applied to the airbag opening portion 66 at the same time the first bag body section 71 opens by the lid 64. Namely, when the lid 64 is pushed open by the first bag body section 71, the impact applied to the door interior member (door lining) 54, having the case interior member 56 fitted therein, can be significantly reduced; thus, even where the airbag opening portion 66, in the form of a hole or recess, is formed to a smaller size, the load imposed (or stress concentrated) on the door interior member (door lining) 54 can be significantly reduced. As a result, it is possible to effectively reduce the thickness of the interior member 54 and hence the weight of the interior member 54, by reducing the size of the airbag opening portion 66.

As noted above, the first bag body section 71, having the gas flow-in portion 81 formed therein, starts to be inflated ahead of the second bag body section 72, so that the lid 64 can be pushed open only by the first bag body section 71 of a relatively small thickness. Therefore, the airbag opening portion 66 can be considerably reduced in size, which can significantly enhance the design freedom of the airbag apparatus.

Further, it is preferable that the plurality of communicating holes 73 be formed in a row parallel to the other or upper edge of the first bag body section 71, in which case the reactive gas can be quickly blown into the second bag body section 72, through the communicating holes 73, so that the second bag body section 72 can be developed quickly. Furthermore, because the second bag body section 72 is developed gradually from its other or upper edge region downward, the development can progress with an enhanced stability.

Figure 8:
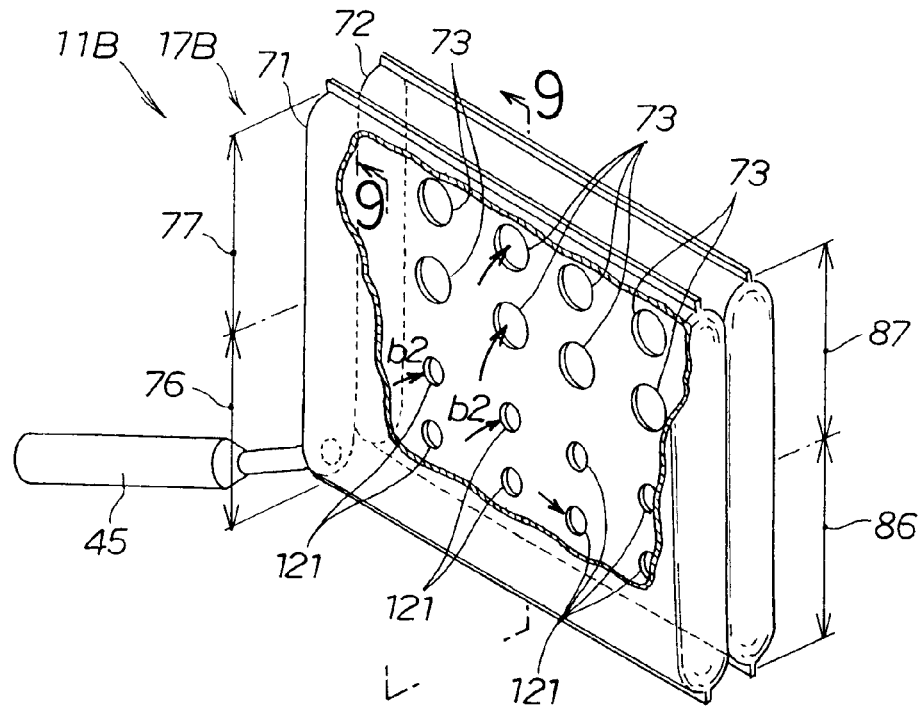
FIG. 8 is a partly-broken-away perspective view of a second embodiment of the airbag apparatus of the present invention.
Figure 9:
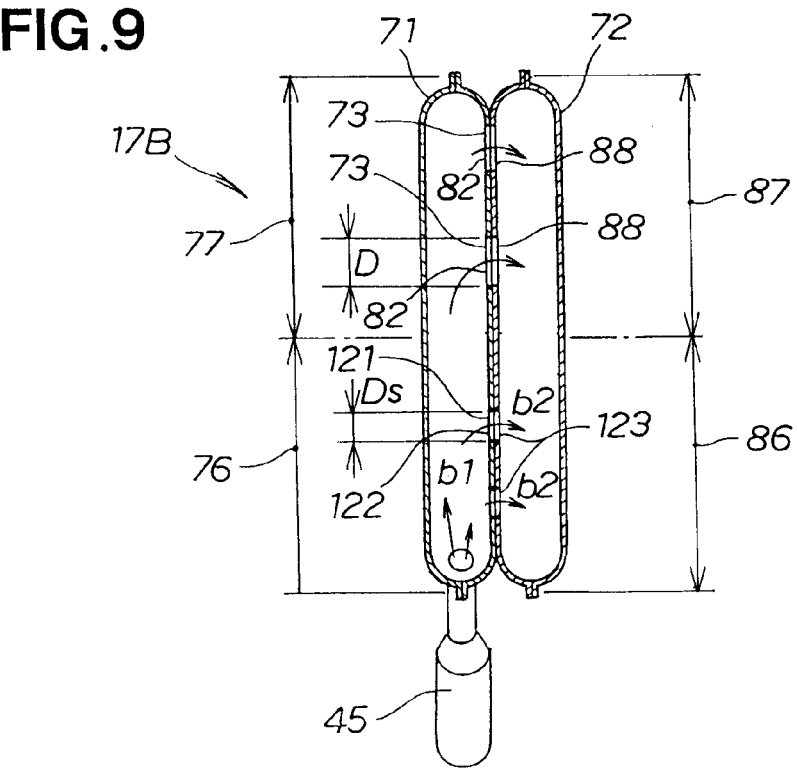
FIG. 9 is a sectional view taken along line 9-9 of FIG. 8.

FIGS. 8 and 9 show a second embodiment of the airbag apparatus of the present invention. The same elements as those shown in FIGS. 1-6 are indicated by the same reference characters as in FIGS. 1-6 and will not be described below to avoid unnecessary duplication.

In the second embodiment of the airbag apparatus 11B, a plurality of pre-communicating holes 121 are formed in the lower half portion 76, closer to the one edge, of the first bag body section 71, in addition to the aforementioned communicating holes 73 formed in the upper half portion 77. The pre-communicating holes 121 are smaller in size than the communicating holes 73.

More specifically, in the right first airbag body 17B, as shown in FIG. 8, the first bag body section 71 has eight holes 82 in its upper half portion 77, and eight small holes 122 in its lower half portion 76. Each of the small holes 122 has a diameter Ds. The second bag body section 72 has also eight holes 88 formed in its upper half portion 87 and corresponding in position to the eight holes 82 of the first bag body section 71, and eight small holes 123 formed in its lower half portion 86 and corresponding in position and size to the eight small holes 122 of the first bag body section 71. Each of the small holes 123 has a diameter Ds. The above-mentioned pre-communicating holes 121 each comprise a pair of the small holes 122 and 123 and thus have the diameter Ds. The diameter Ds of the pre-communicating holes 121 are smaller than the diameter D of the communicating holes 73.

In the second embodiment of the airbag apparatus 11B shown in FIGS. 8 and 9, the pre-communicating holes 121 are provided as auxiliaries to the communicating holes 73, and the communicating holes 73 formed in the upper half portions 77 and 87 are greater in diameter than the pre-communicating holes 121 formed in the lower half portions 76 and 86.

It is preferable that pre-communicating holes 121 be provided in a row adjacent to and parallel to the one edge of the first bag body section 71.

Whereas, in the illustrated example, each of the communicating holes 73 is shown as having a circular shape, it may be of an elliptical or triangular shape.

Further, the number of the communicating holes 73 may be any desired plural number other than eight, and the number of the pre-communicating holes 121 too may be any other number than eight, such as three or four.

Further, whereas the sets of the communicating holes 73 and pre-communicating holes 121 are each shown as formed in two horizontal rows with the holes 73 or 121 in the upper and lower rows arranged in vertical alignment, the holes 73 or 121 in the upper and lower rows may be formed in a staggering arrangement.

The second embodiment of the airbag apparatus 11B accomplishes the same advantageous benefits as the first embodiment of the airbag apparatus 11. Namely, even where the airbag opening portion 66 is formed to a smaller size, the load imposed on the door interior member 54 can be significantly reduced. Therefore, the airbag opening portion 66 can be reduced in size, which can significantly enhance the design freedom of the airbag apparatus.

With the pre-communicating holes 121, smaller in size than the communicating holes 73, formed in the lower half portions 76 and 86, the second embodiment of the airbag apparatus 11B allows the reactive gas to be directed from the inflator 45, through the pre-communicating holes 121, into the second bag body section 72 as indicated by arrows b2 as the reactive gas is blown into the first bag body section 71 as indicated by arrows b1. Thus, the second embodiment 11B can inflate the second bag body section 72 in a shorter time than the first embodiment where no such pre-communicating hole 121 is provided, so that the necessary time for developing the right first airbag body 17B can be reduced.

Next, a description will be given about a third embodiment of the airbag apparatus 11C of the present invention, with reference to FIGS. 10-12. The same elements as those in the first embodiment shown in FIGS. 1-6 are indicated here by the same reference characters as in FIGS. 1-6 and will not be described below to avoid unnecessary duplication.

The third embodiment of the airbag apparatus 11C is shown in FIG. 10 as applied to a two-seat convertible vehicle 12C. The left first airbag body (airbag) 14C of the left door airbag device 35C is disposed in the left door 24, while the right first airbag body (airbag) 17C of the right door airbag device 36C is disposed in the right door 25.

The vehicle 12C includes an openable/closeable roof 21C, left and right doors 24 and 25, driver's seat 31 and front passenger's seat 32.

The left first airbag body 14C and the right first airbag body 17C are similar in construction and located horizontally symmetrically with each other, and thus, the following paragraphs describe primarily the right first airbag body 17C.

Figure 11:
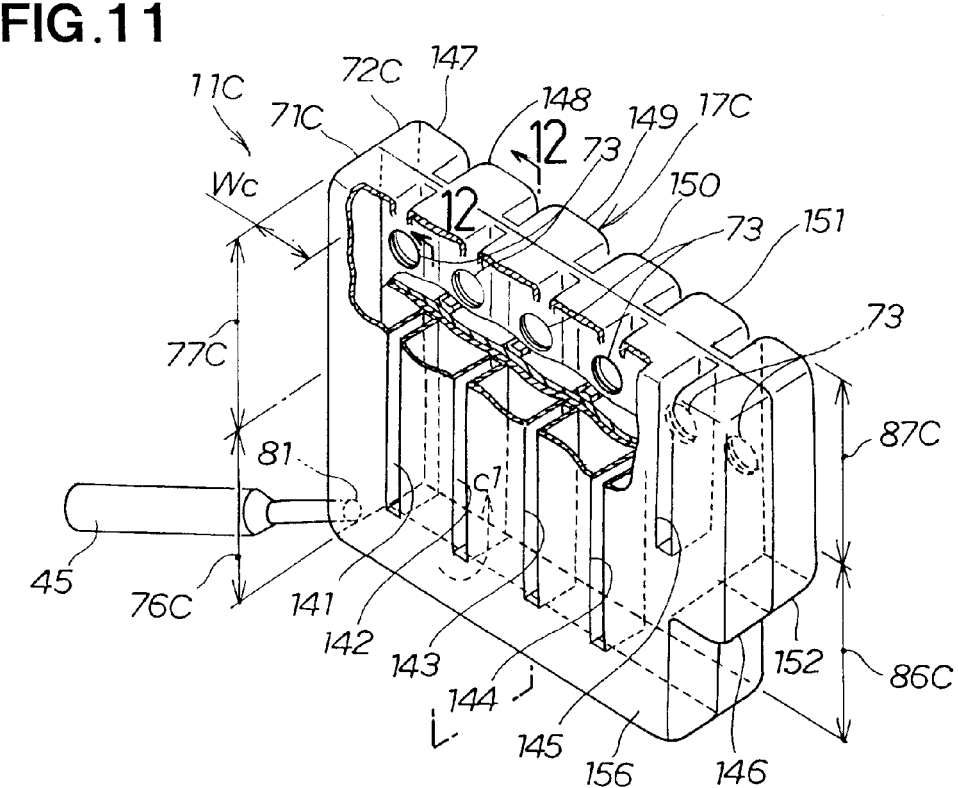
FIG. 11 is a partly-broken-away perspective view of the airbag apparatus shown in FIG. 10.
Figure 12:
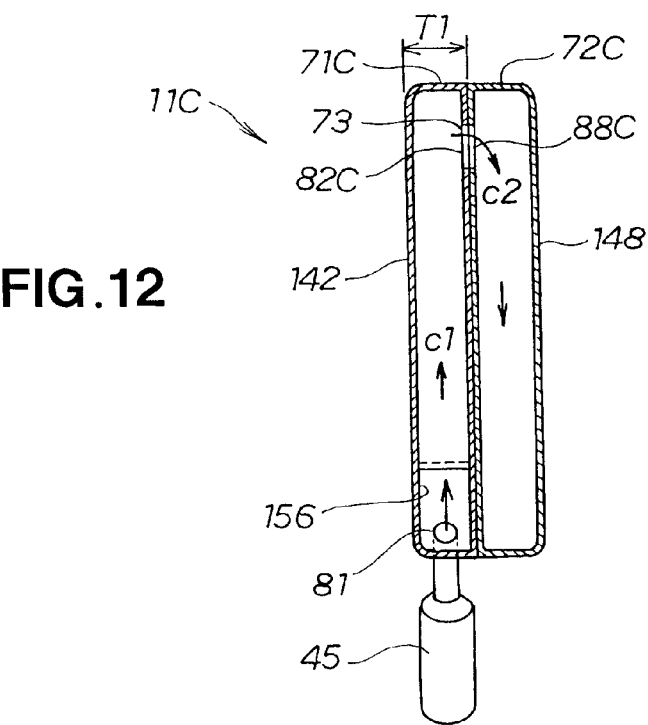
FIG. 12 is a sectional view taken along line 12-12 of FIG. 11.

As shown in FIGS. 11 and 12, the right first airbag body (airbag) 17C comprises a first bag body section 71C, and a second bag body section 72C combined with the first bag body section 71C in superposed relation thereto. The first and second bag body sections 71C and 72C communicate with each other through the plurality of communicating holes 73. The first bag body section 71C is disposed in a position corresponding to a vehicle occupant M shown in FIG. 7A, and the second bag body section 72C is disposed in a position corresponding to the door glass 57 shown in FIG. 7A.

The first bag body section 71C includes first to sixth separate (or independent) gas filling portions 141-146 arranged in a front-rear-direction of the vehicle and each extending vertically in an up-down direction of the vehicle. These first to sixth vertical gas filling portions 141-146 are slightly spaced apart from each other to function independently of one another, and each of the portions 141-146 is open at its lower end to communicate with a common gas distribution path 156 formed in a lower region of the lower half portion 76C of the first bag body section 71C. The reactive gas, having been blown from the inflator 45 through the gas flow-in portion 81 into the common gas distribution path 156, is then blown into the individual gas filling portions 141-146.

The second bag body section 72C includes seventh to twelfth separate (or independent) gas filling portions 147-152 arranged in the front-rear-direction of the vehicle and each extending in the up-down direction of the vehicle. These seventh to twelfth gas filling portions 147-152 are slightly spaced apart from each other to function independently of one another.

The first to sixth gas filling portions 141-146 of the first bag body section 71C and the seventh to twelfth gas filling portions 147-152 of the second bag body section 72C are superposed on each other in such a manner that the portions 141-146 face the corresponding gas filling portions 147-152. The communicating holes 73 are formed in the mutually-facing upper half portions 77C and 87C of the first and second bag body sections 71C and 72C, so that corresponding ones of the gas filling portions 141-146 and gas filling portions 147-152 communicate with each other through the communicating holes 73.

More specifically, the first gas filling portion 141 and seventh gas filling portion 147 communicate with each other through one of the communicating holes 73 formed in the mutually-facing upper half portions 77C and 87C of the first and second bag body sections 71C and 72C, the second gas filling portion 142 and eighth gas filling portion 148 communicate with each other through another one of the communicating holes 73, the third gas filling portion 143 and ninth gas filling portion 149 communicate with each other through still another one of the communicating holes 73, the fourth gas filling portion 144 and tenth gas filling portion 150 communicate with each other through still another one of the communicating holes 73, and so on.

Each of the gas filling portions 141-146 and gas filling portions 147-152 has a width Wc.

Holes 82C formed in upper regions of the first to sixth gas filling portions 141-146 of the first bag body section 71C and holes 88C formed in upper regions of the seventh to fifth gas filling portions 147-152 of the second bag body section 72C correspond to each other in size and position, and each of the communicating holes 73 comprises one of the holes 82C and one of the holes 88C.

Now, a description will be given about behavior of the third embodiment of the airbag apparatus 11C.

Upon activation of the inflator 45, the reactive gas is emitted from the inflator 45 through the gas flow-in portion 81 into the gas distribution path 156. The gas, having been emitted into the gas distribution path 156, is blown only into the gas filling portions 141-146 of the first bag body section 71C from below the gas filling portions 141-146 as indicated by arrow c1, so that the reinforcing lid 63 and lid 64 (see FIG. 4) of the first to sixth gas filling portions 141-146 are opened.

As the inflator 45 continues to blow the reactive gas into the first to sixth gas filling portions 141-146 of the first bag body section 71C, only the gas filling portions 141-146 of the first bag body section 71C are first inflated to the thickness T1, leaving about 40% of the width W of the airbag opening portion 66. Thus, it is possible to reduce a load transmitted to the interior member 56 when the first bag body section 71 is developed.

As the inflator 45 further continues to blow the reactive gas into the first to sixth gas filling portions 141-146 of the first bag body section 71C, the reactive gas, having almost filled the first to sixth gas filling portions 141-146, passes through the individual communicating holes 73, as indicated by arrow c2 in FIG. 7B, to start gradually inflating the seventh to twelfth vertical gas filling portions 147-152 of the second bag body section 72C from their respective upper regions downward.

The third embodiment of the airbag apparatus 11C accomplishes the same advantageous benefits as the first embodiment of the airbag apparatus 11. Namely, even where the airbag opening portion 66 is formed to a smaller size, the load imposed on the door interior member 54 can be significantly reduced. Therefore, the airbag opening portion 66 can be reduced in size, which can significantly enhance the design freedom of the airbag apparatus.

In an alternative, pre-communicating holes 121, smaller in size than the communicating holes 73, may be formed in the lower half portions 76C and 86C, in a similar manner to those shown in FIGS. 8 and 9. By the provision of such pre-communicating holes 121, the necessary time for developing the right first airbag body 17C can be reduced as with the second embodiment of the airbag apparatus 11B.

Figure 13:
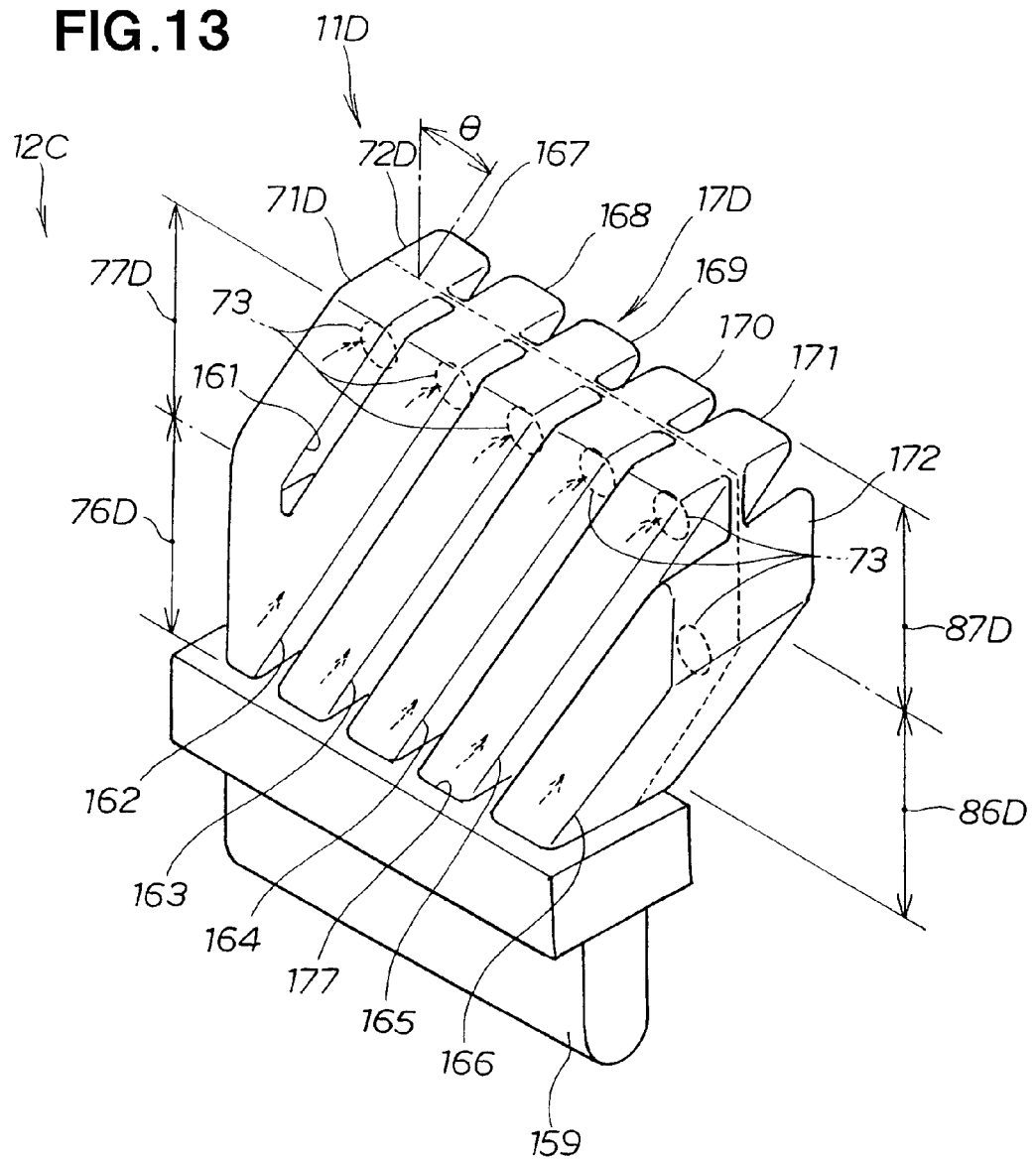
FIG. 13 is a partly-broken-away perspective view of a fourth embodiment of the airbag apparatus of the present invention.

Whereas the third embodiment of the airbag apparatus 11C has been shown and described as employing the inflator 45 constructed in the aforementioned manner, the inflator 45 may be replaced with an inflator 159 as shown in FIG. 13. For example, the reactive gas to be blown into the first to sixth gas filling portions 141-146 may be supplied directly from the inflator 159.

Further, whereas the third embodiment of the airbag apparatus 11C has been shown and described above as applied to the two-seat convertible vehicle 12C, it may be applied to the four-seat convertible vehicle 12 shown in FIG. 1. In the case where the third embodiment is applied to the four-seat convertible vehicle 12, the left rear airbag device 37 provided in the left side body 22 is constructed generally similarly to the left door airbag device 35C, and the right rear airbag device 38 provided in the right side body 23 is constructed generally similarly to the right door airbag device 36C.

Now, a description will be given about a fourth embodiment of the airbag apparatus of the present invention, with primary reference to FIG. 13.

The fourth embodiment of the airbag apparatus 11D is a modification of the third embodiment of the airbag apparatus 11C shown in FIGS. 11 and 12. The same elements as those in the first to third embodiments are indicated by the same reference characters as in the first to third embodiments and will not be described below to avoid unnecessary duplication.

The fourth embodiment of the airbag apparatus 11D is shown and described here as applied to the two-seat convertible vehicle 12C shown in FIG. 10, which includes a right first airbag body (airbag) 17D of the right door airbag device.

The right first airbag body (airbag) 17D in the fourth embodiment comprises a first bag body section 71D, and a second bag body section 72D combined with the first bag body section 71D in superposed relation thereto. The first bag body section 71D comprises a lower half portion 76D closer to one edge of the section 71D, and an upper half portion 77D closer to the other edge of the section 71D. The second bag body section 72D comprises a lower half portion 86D closer to one edge of the section 72D, and an upper half portion 87D closer to another edge, opposite from the one edge, of the section 72D.

As in the above-described third embodiment, the first bag body section 71C in the fourth embodiment includes first to sixth separate (independent) gas filling portions 161-166 arranged in the front-rear-direction of the vehicle and capable of functioning independently of one another, while the second bag body section 72D includes seventh to twelfth separate gas filling portions 167-172 arranged in the front-rear-direction of the vehicle and capable of functioning independently of one another.

The fourth embodiment of the airbag apparatus 11D is characterized in that the aforementioned first to twelfth gas filling portions 161-172 are each inclined at an angle θ in the rearward direction of the vehicle 12C.

The first to sixth gas filling portions 161-166 of the first bag body section 71D and the seventh to twelfth gas filling portions 167-172 of the second bag body section 72D are superposed on each other in such a manner that the gas filling portions 161-166 face the corresponding gas filling portions 167-172. The communicating holes 73 are formed in the mutually-facing upper half portions 77D and 87D.

The first bag body section 71D has, in the lower end of the lower half portion 76D, a gas flow-in portion 177 for connection to an inflator 159. Upon activation of the inflator 159, the reactive gas is blown from the inflator 159 to inflate the first to sixth gas filling portions 161-166 of the first bag body section 71D ahead of the seventh to twelfth gas filling portions 167-172 and then inflate the seventh to twelfth gas filling portions 167-172 of the second bag body section 72D through the communicating holes 73 as indicated by arrows.

In the fourth embodiment, the right first airbag body 17D, which is inclined in the rearward direction of the vehicle 12C as noted above, can appropriately conform to an inclination angle of the backrest of the driver's seat or the like.

The fourth embodiment of the airbag apparatus 11D accomplishes the same advantageous benefits as the third embodiment of the airbag apparatus 11C. Namely, even where the airbag opening portion 66 is formed to a smaller size, the load imposed on the door interior member 54 can be significantly reduced. Therefore, the airbag opening portion 66 can be reduced in size, which can significantly enhance the design freedom of the airbag apparatus.

In an alternative, pre-communicating holes 121, smaller in size than the communicating holes 73, may be formed in the lower half portions 76D and 86D, in a similar manner to those shown in FIGS. 8 and 9. By the provision of such pre-communicating holes 121, the necessary time for developing the right first airbag body 17D can be reduced as with the second embodiment of the airbag apparatus 11B.

Next, a description will be given about a fifth embodiment of the airbag apparatus of the present invention, with primary reference to FIGS. 14-16D. The same elements as those shown in FIGS. 1-6 are indicated by the same reference characters as in the first embodiment and will not be described below to avoid unnecessary duplication.

The fifth embodiment of the airbag apparatus 11E, which is a side curtain airbag applied to a vehicle 181, is characterized by including a right airbag body (airbag) 183 to be developed from a right side wall 182 to the interior of the vehicle 181.

Although not specifically shown, the fifth embodiment of the airbag apparatus 11E also includes a left airbag body that is provided horizontally symmetrically with the right airbag body 183 and that is to be developed from a left side wall of the vehicle 181 to the interior of the vehicle 181. The following paragraphs describe a right curtain airbag device 184 including the right airbag body 183.

The vehicle 181 is a four-door sedan, which includes an under body 185, a right side body 186 connecting with the under body 185, right front and right rear doors 187 and 188 openably/closeably mounted to the right side body 186, a roof 189 connecting with the right side body 186, a driver's seat 191 mounted on the under body 185, and a rear seat 192 located behind the driver's seat 191. Reference numerals 193 and 194 indicate front and rear door glasses, respectively.

The side wall 182 comprises the front door glass 193 of the right front door 187, and the rear door glass 194 of the right rear door 188.

Figure 16A:
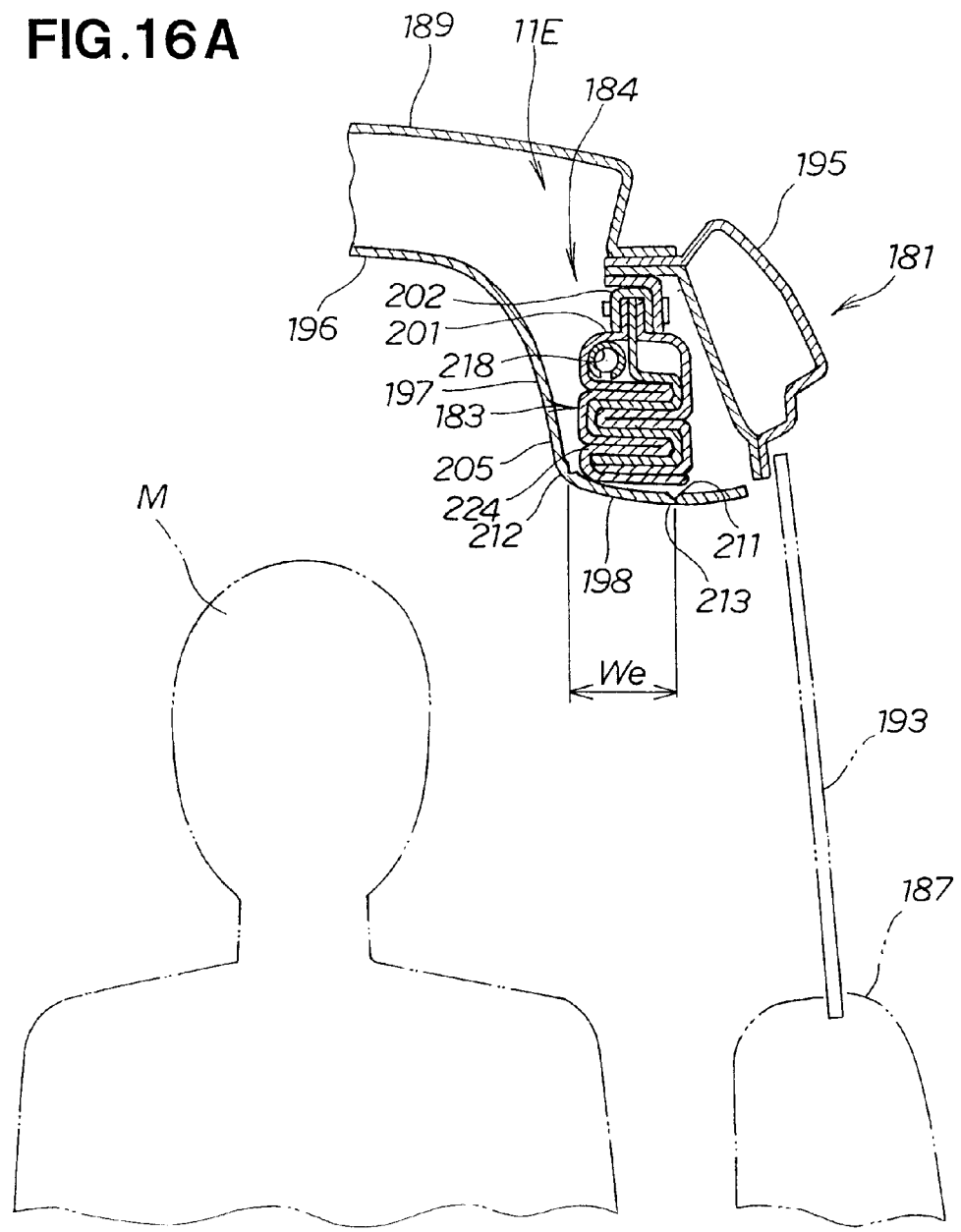
FIGS. 16A-16D are sectional views showing a manner in which the right curtain airbag device is developed.

As shown in FIG. 16A, the roof 189 includes an interior member 196 engaging with a roof side rail 195, and a lid 198 is provided on the interior member 196 near an end 197 of the member 196.

Further, in the fifth embodiment of the airbag apparatus 11E, the right curtain airbag device 184 includes: the right airbag body 183; a plurality of bag mounting members 202 for connecting an upper end portion 201 of the right airbag body 183 to the roof side rail 195; an inflator (gas generator device) 204 positioned at the rear end of the right airbag body 183 and fixed to a rear pillar 203 (see FIG. 14); a storage section 205 for storing the right airbag body 183 in folded form; and the lid 198 provided on the interior member 196 of the roof 189 and connecting with the storage section 205.

The above-mentioned lid 198 is provided on a side end portion of the interior member 196 and has a width We. The lid 198 includes a tear line 211 in the form of a groove formed in the reverse side of the interior member 196, and a hinge section 212 in the form of a groove formed in the reverse side of the interior member 196. Once the tear line 211 is broken, the lid 198 opens with the hinge section 212 functioning as a pivot axis, and thus, there is formed an airbag opening portion 212 of the width We.

As illustrated in FIG. 15, the inflator 204 comprises a cylindrical housing 217, and a supply pipe 218 communicating with the interior of the housing 217. The supply pipe 218 is located within the right airbag body 183 adjacent to the upper end portion 201.

The right airbag body 183 is connected via the supply pipe 218 to the inflator 204, and it includes a front bag section 219 to be developed in a position corresponding to the driver's seat 191 (FIG. 14) and a rear bag section 221 to be developed in a position corresponding to the rear seat 192 (FIG. 14).

Further, the right airbag body 183 comprises a first bag body section 224, and a second bag body section 225 combined with the first bag body section 224 in superposed relation thereto. The first and second bag body sections 224 and 225 communicate with each other through a plurality of communicating holes 73E. The first bag body section 224 is disposed in a position corresponding to front and rear vehicle occupants M (FIG. 16C), and the second bag body section 225 is disposed to face the front and rear door glass 193 and 194 in their closed positions. The right airbag body 183 is formed to be inflatable to an overall thickness Te in its inflated state. The thickness Te is set to about 1.7 times as great as a width We of an airbag opening portion 213 shown in FIG. 16.

The first bag body section 224 comprises an upper half portion 226 closer to one edge of the section 224, and a lower half portion 227 closer to another edge, opposite from the one edge, of the section 224. Gas flow-in portion 231 is formed in an upper region 228 of the upper half portion 226 and is connected to the inflator 204. Holes 232, each forming part of the communicating hole 73E, are formed in a lower region 232 of the lower portion 227. The holes 82 each have a diameter De.

Figure 16B:
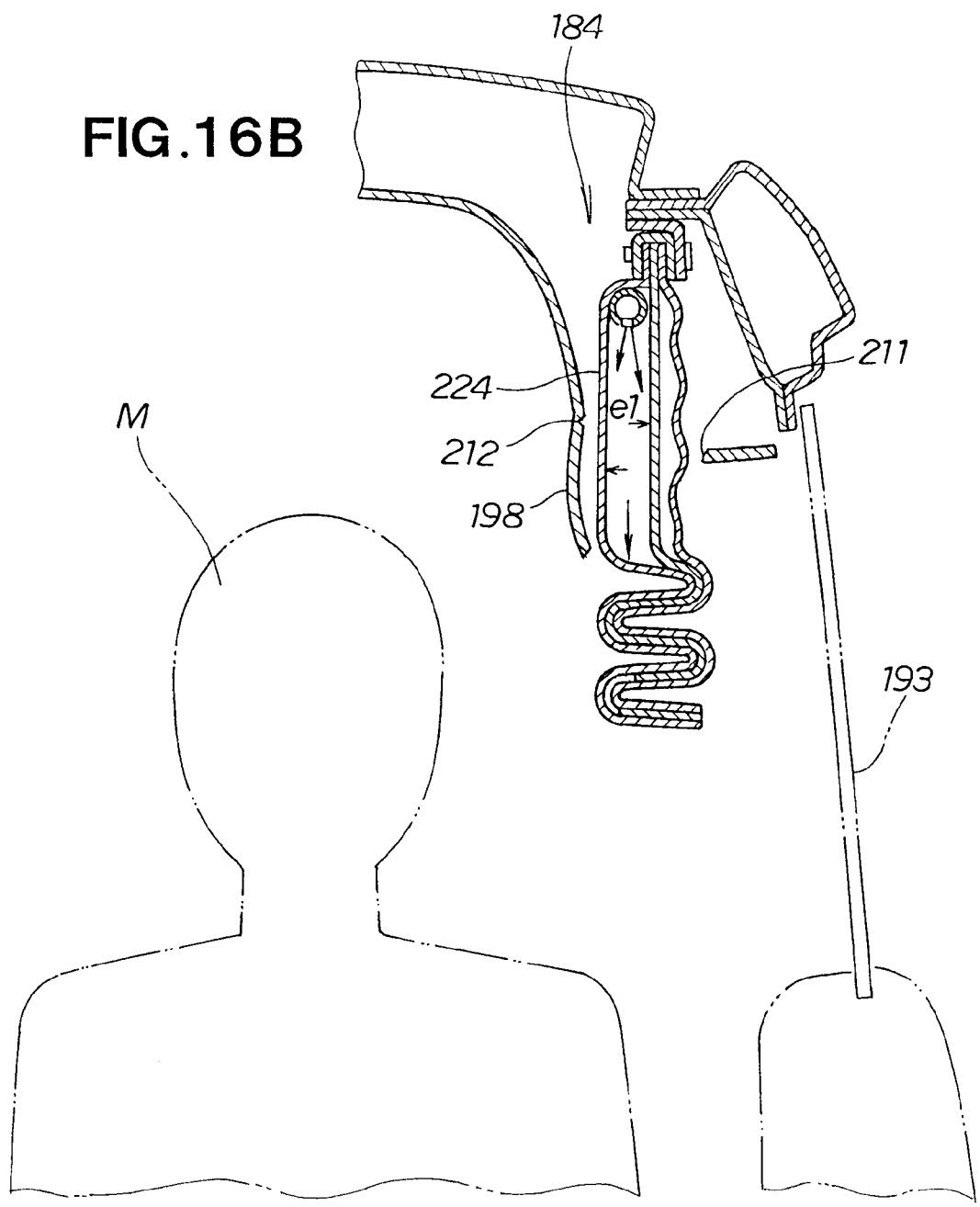
Figure 16C:
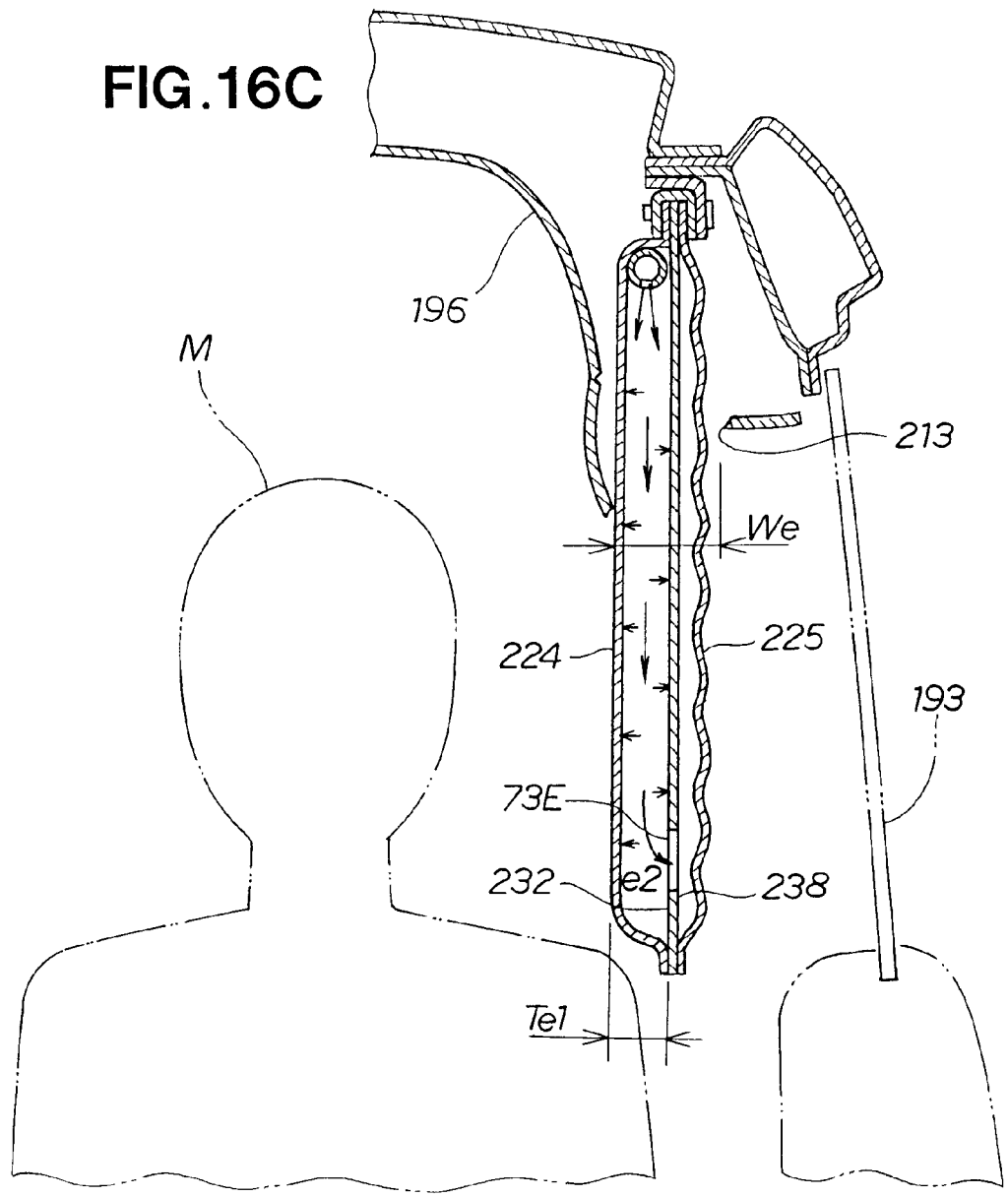
Figure 16D:
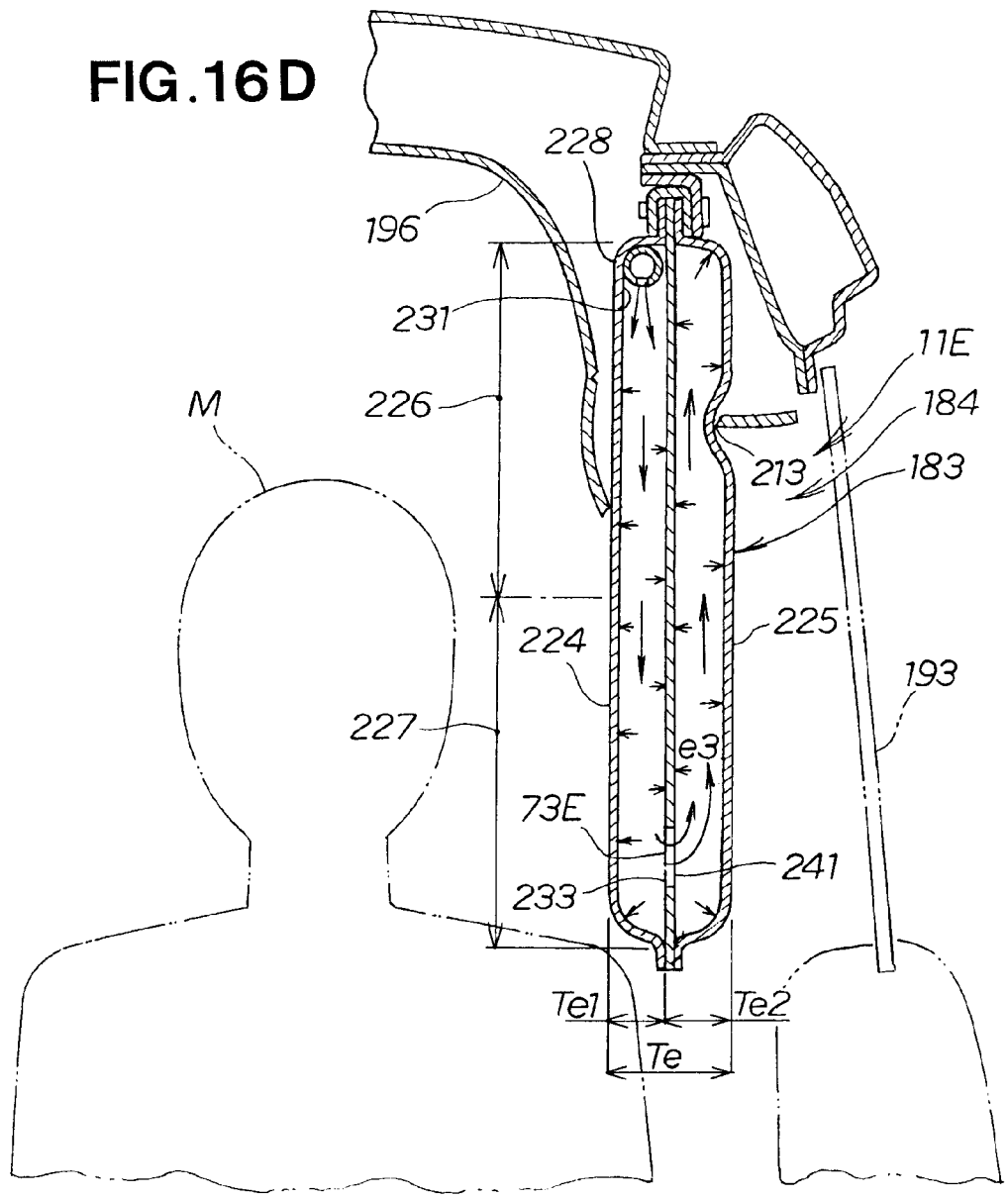

The first bag body section 224 has a thickness Te1 in its inflated state as shown in FIG. 16D. The thickness Te1 is about 50% of the above-mentioned thickness Te of the right airbag body 183 and about 60% of the width We of the airbag opening portion 213 (FIG. 16A).

The second bag body section 225 comprises an upper half portion 236 closer to one edge of the section 225, and a lower half portion 237 closer to another edge, opposite from the one edge, of the section 225. The lower half portion 237 has, in its lower region 238, holes 241 each corresponding in position and size to one of the holes 233 of the first bag body section 224 and forming a part of one of the communicating holes 73E. Namely, each of the communicating holes 73E comprises one of the holes 233 formed in the first bag body section 224, and one of the holes 241 formed in the second bag body section 225.

The second bag body section 225 has a thickness Te2 in its inflated state as shown in FIG. 16D, and the thickness Te2 is about 50% of the above-mentioned thickness Te of the right airbag body 183 and about 60% of the width We of the airbag opening portion 213 (FIG. 16A).

Now, a description will be given about behavior of the fifth embodiment of the airbag apparatus 11E, with primary reference to FIGS. 16A-16D.

When the vehicle 181 has caused a front or lateral collision, the inflator 204 (FIG. 15) of the right curtain airbag device 184 is activated on the basis of information output from the airbag control unit 19 (FIG. 1), to start supplying, via the supply pip 218, the reactive gas to the folded first bag body section 224.

Once the reactive gas is blown from the inflator 204 only into the first bag body section 224 as indicated by arrows e1 in FIG. 16B, the first bag body section 224 breaks the tear line 211, after which the lid 198 opens with the hinge section 224 functioning as a pivot axis.

As the inflator 204 continues to blow the reactive gas into the first bag body section 224, only the first bag body section 224 is first inflated to the thickness T1 to occupy about 60% of the width We of the airbag opening portion 213, as shown in FIG. 16C. Thus, it is possible to reduce a load transmitted to the case interior member 196 when the first bag body section 224 is developed.

As the inflator 204 further continues to blow the reactive gas into the first bag body section 224, the reactive gas, having almost filled the first bag body section 224, passes through the plurality of communicating holes 73E, as indicated by arrows e2, to start gradually inflating the second bag body section 225 from near the lower region 238 of the section 225 upward.

As the reactive gas is blown through the plurality of communicating holes 73E into the second bag body section 225 as indicated by arrows e3 in FIG. 16D, the second bag body section 225 is developed to instantly reach the thickness Te2. Thus, the right airbag body 183 is developed to the predetermined thickness Te.

The fifth embodiment of the airbag apparatus 11E accomplishes the same advantageous benefits as the first embodiment of the airbag apparatus 11. Namely, even where the airbag opening portion 213 is formed to a smaller size, the load imposed on the door interior member 196 can be significantly reduced. Therefore, the airbag opening portion 213 can be reduced in size, which can significantly enhance the design freedom of the airbag apparatus.

Figure 17:
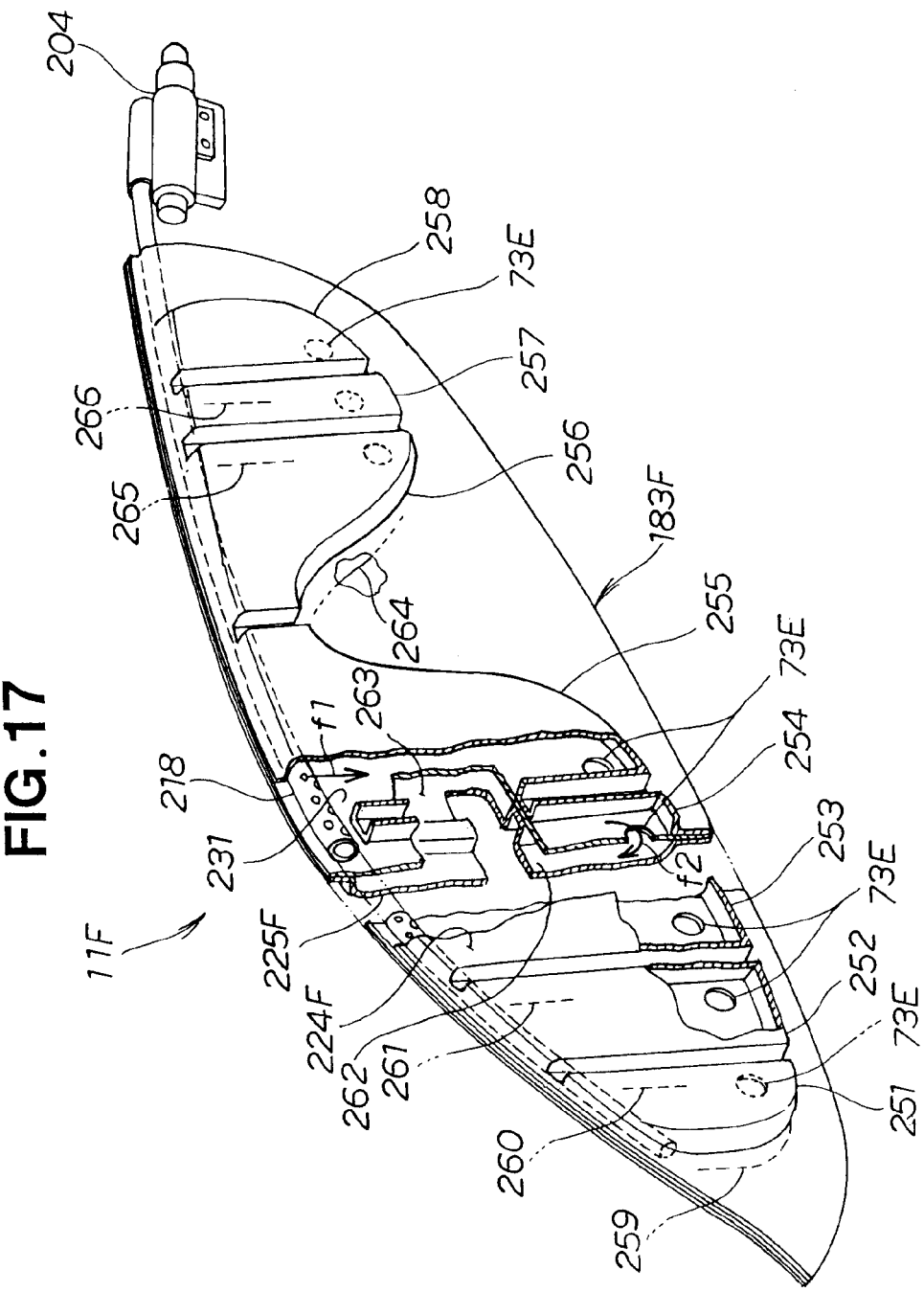
FIG. 17 is a partly-broken-away perspective view of a sixth embodiment of the airbag apparatus of the present invention.
Figure 18:
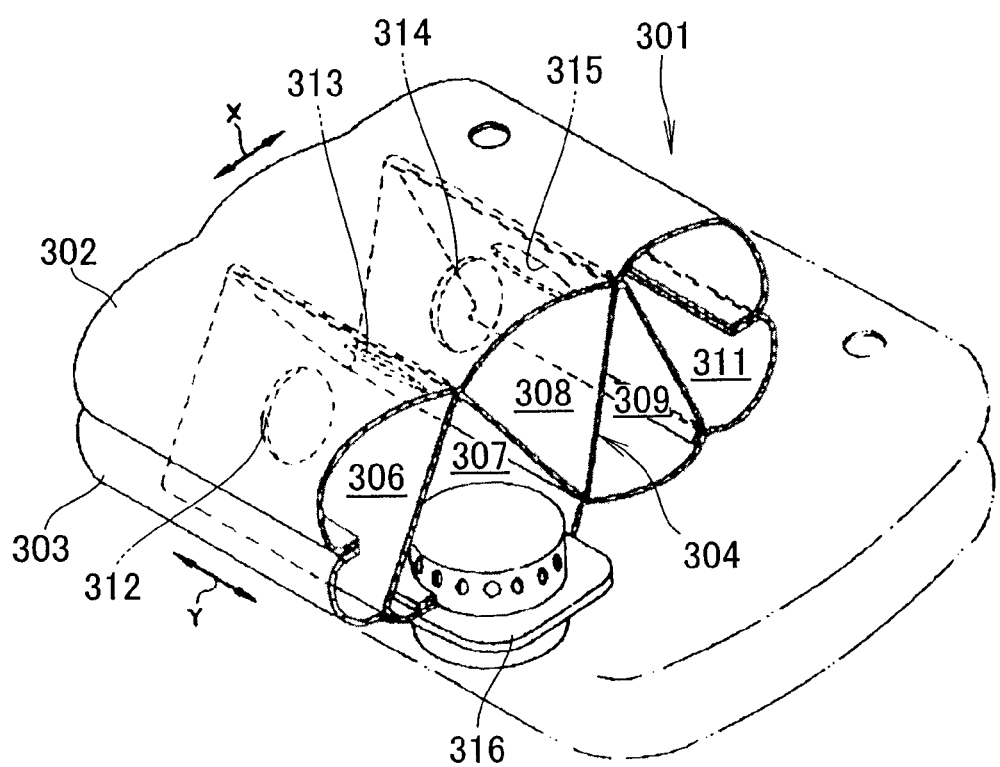
FIG. 18 is a perspective view of a conventionally-known airbag apparatus.

Next, a description will be given about a sixth embodiment of the airbag apparatus 11F of the present invention, with primary reference to FIG. 17 and with additional reference to FIGS. 14 and 15.

Right airbag body (airbag) 183F comprises a first bag body section 224F, and a second bag body section 225F combined with the first bag body section 224F in superposed relation thereto. The first and second bag body sections 224F and 225F communicate with each other through a plurality of communicating holes 73E. The first bag body section 224F is disposed to take a position corresponding to front and rear vehicle occupants M (FIG. 16D) in its developed state, and the second bag body section 225F is disposed to face front and rear door glass 193 and 194 (FIG. 14) in its developed state.

The first bag body section 224F includes first to eighth separate (independent) gas filling portions 251-258 arranged in the front-rear-direction of the vehicle and extending vertically (in the up-down direction of the vehicle). These first to eighth vertical gas filling portions 251-258 are slightly spaced apart from each other to function independently of one another, and each of the gas filling portions 251-258 is open at its upper end to communicate with the supply pipe 218. Reactive gas emitted from the inflator 204 is supplied, through the supply pipe 218, into the individual gas filling portions 251-258.

The second bag body section 225F includes ninth to sixteenth separate (independent) gas filling portions 259-266 arranged in the front-rear-direction of the vehicle. These ninth to sixteenth vertical gas filling portions 259-266 are slightly spaced apart from each other to function independently of one another.

The first to eighth gas filling portions 251-258 of the first bag body section 224F and the ninth to sixteenth gas filling portions 259-266 of the second bag body section 225F are superposed on each other in such a manner that the first to eighth portions 251-258 face the corresponding gas filling portions 259-266. The communicating holes 73E are formed in mutually-facing lower portions of the first and second bag body sections 224F and 225F, so that the corresponding ones of the gas filling portions 251-258 and gas filling portions 259-266 communicate with each other through the communicating holes 73E.

More specifically, the first gas filling portion 251 and ninth gas filling portion 259 communicate with each other through one of the communicating holes 73E, the second gas filling portion 252 and tenth gas filling portion 260 communicate with each other through another one of the communicating holes 73E, the third gas filling portion 253 and eleventh gas filling portion 261 communicate with each other through still another one of the communicating holes 73E, the fourth gas filling portion 254 and twelfth gas filling portion 262 communicate with each other through still another one of the communicating holes 73E, and so on.

The sixth embodiment of the airbag apparatus 11F behaves similarly to the above-described fifth embodiment of the airbag apparatus 11E.

Namely, upon activation of the inflator 204, the reactive gas is blown from the inflator 159 only into the first to eighth gas filling portions 251-258 of the first bag body section 224F as indicated by arrow f1, so that the first to eighth gas filling portions 251-258 of the first bag body section 224F start to be developed.

As the inflator 204 further continues to blow the reactive gas into the first to eighth gas filling portions 251-258 of the first bag body section 224F, the reactive gas, having almost filled the gas filling portions 251-258, passes through the individual communicating holes 73E, as indicated by arrow f2, so that the ninth to sixteenth vertical gas filling portions 259-266 of the second bag body section 225F are gradually developed from near their lower regions upward.

In the sixth embodiment of the airbag apparatus 11F, the first to sixteenth gas filling portions 251-266 may be inclined in the rearward direction of the vehicle as in the fourth embodiment of FIG. 13.

Whereas the embodiments of the airbag apparatus of the present invention have been shown and described above in relation to the case where each of the bag body sections has a flat shape having a uniform thickness T1 or T2 throughout the almost entire height thereof, the thickness T1 or T2 may be differentiated along the height direction.

Further, whereas the airbag bodies have been described as having a generally rectangular shape, they may be of, for example, a circular, polygonal or cloud shape.

Furthermore, whereas each of the airbag bodies in the various embodiments has been described above as comprising the first and second bag body sections combined together in superposed relation, the present invention is not so limited, and the airbag body may comprise three or more bag body sections combined together in superposed relation, with communicating holes formed in superposed portions of the bag body sections, so that the first one of the bag body sections is developed ahead of the other bag body sections, then the second bag body section is developed, then the third bag body section is developed, and so on.

Obviously, various minor changes and modifications of the present invention are possible in light of the above teaching. It is therefore to be understood that within the scope of the appended claims the invention may be practiced otherwise than as specifically described.

What is claimed is:

1. An airbag apparatus for a vehicle, comprising:

an inflator that emits gas in response to an impact experienced by the vehicle; and an airbag that is developed along an inner surface of the vehicle by the gas that is emitted by said inflator, said developed airbag including a first bag body section and a second bag body section superposed on each other in a lateral direction of the vehicle to provide a predetermined overall thickness, the first bag body section facing in a lateral inward direction of the vehicle, the second bag body section being disposed between the first bag body section and the inner surface of the vehicle, the first bag body section having a gas flow-in portion adjacent to a first edge thereof, the gas flow-in portion being connected to the inflator, wherein a communicating hole is formed in said first and second bag body sections at a location that is opposite from the first edge to allow said first and second bag body sections to communicate with each other, and whereby, after the impact is experienced by the vehicle, the first bag body section is inflated before the second bag body section is inflated.

2. The airbag apparatus of claim 1, wherein a pre-communicating hole having a smaller size than the communicating hole is formed in said plurality of bag body sections adjacent to the first edge.

3. The airbag apparatus of claim 1, wherein a plurality of the communicating holes are formed adjacent to and along the location that is opposite from the first edge.

4. The airbag apparatus of claim 2, wherein a plurality of the pre-communicating holes are formed adjacent to and along the first edge.

5. The airbag apparatus of claim 1, wherein each of said first and second bag body sections includes a plurality of separate gas filling portions that are arranged in a front-rear direction of the vehicle and extend in an up-down direction of the vehicle.

6. The airbag apparatus of claim 5, wherein said plurality of gas filling portions are inclined at a predetermined angle toward a rear of the vehicle.

7. The airbag apparatus of claim 1, wherein each of said plurality of bag body sections includes a front bag section to be developed in a position corresponding to a front seat of the vehicle, and a rear bag section, connecting with the front bag section, to be developed in a position corresponding to a rear seat of the vehicle.

* * * * *